(12) United States Patent
Steinberger et al.

(10) Patent No.: US 11,137,053 B2
(45) Date of Patent: Oct. 5, 2021

(54) THREE PLANETARY INLINE EMIVT

(71) Applicant: Oshkosh Corporation, Oshkosh, WI (US)

(72) Inventors: David J. Steinberger, Oshkosh, WI (US); Jon J. Morrow, Oshkosh, WI (US); Eric E. Braun, Neenah, WI (US); Andrew J. Kotloski, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 16/928,808

(22) Filed: Jul. 14, 2020

(65) Prior Publication Data

US 2021/0018072 A1 Jan. 21, 2021

Related U.S. Application Data

(60) Provisional application No. 62/874,402, filed on Jul. 15, 2019.

(51) Int. Cl.
*F16H 3/72* (2006.01)

(52) U.S. Cl.
CPC ........ *F16H 3/728* (2013.01); *F16H 2200/201* (2013.01); *F16H 2200/2035* (2013.01)

(58) Field of Classification Search
CPC ............... F16H 3/728; F16H 2200/201; F16H 2200/2035; F16H 3/72
See application file for complete search history.

(56) References Cited

U.S. PATENT DOCUMENTS

| | | |
|---|---|---|
| 5,498,208 A | 3/1996 | Braun |
| 5,501,567 A | 3/1996 | Lanzdorf et al. |
| 5,607,028 A | 3/1997 | Braun et al. |
| 5,820,150 A | 10/1998 | Archer et al. |
| 5,820,258 A | 10/1998 | Braun |
| 6,086,074 A | 7/2000 | Braun |
| 6,105,984 A | 8/2000 | Schmitz et al. |
| 6,516,914 B1 | 2/2003 | Andersen et al. |
| 6,757,597 B2 | 6/2004 | Yakes et al. |

(Continued)

FOREIGN PATENT DOCUMENTS

| | | |
|---|---|---|
| DE | 10 2006 019 679 | 11/2006 |
| DE | 10 2014 006 134 | 6/2015 |
| DE | 10 2014 006 143 | 6/2015 |

OTHER PUBLICATIONS

International Search Report and Written Opinion regarding International Application No. US2020/042020 dated Oct. 21, 2020, 14 pps.

*Primary Examiner* — Huan Le
(74) *Attorney, Agent, or Firm* — Foley & Lardner LLP

(57) ABSTRACT

A drive system for a vehicle includes a first planetary gear set, a second planetary gear set, a third planetary gear set, a first electromagnetic device coupled to the first planetary gear set, a second electromagnetic device coupled to the second planetary gear set, and an output shaft coupled to the first planetary gear set. The third planetary gear set includes a sun gear, a ring gear, planetary gears coupling the sun gear to the ring gear, and a carrier rotationally supporting the planetary gears. The ring gear is directly coupled to the first planetary gear set and the second planetary gear set. The sun gear is directly coupled to the second planetary gear set.

20 Claims, 13 Drawing Sheets

(56) References Cited

U.S. PATENT DOCUMENTS

| | | |
|---|---|---|
| 6,885,920 B2 | 4/2005 | Yakes et al. |
| 7,073,620 B2 | 7/2006 | Braun et al. |
| 7,073,847 B2 | 7/2006 | Morrow et al. |
| 7,140,461 B2 | 11/2006 | Morrow |
| 7,164,977 B2 | 1/2007 | Yakes et al. |
| 7,258,194 B2 | 8/2007 | Braun et al. |
| 7,277,782 B2 | 10/2007 | Yakes et al. |
| 7,357,203 B2 | 4/2008 | Morrow et al. |
| 7,419,021 B2 | 9/2008 | Morrow et al. |
| 7,448,460 B2 | 11/2008 | Morrow et al. |
| 7,520,354 B2 | 4/2009 | Morrow et al. |
| 7,689,332 B2 | 3/2010 | Yakes et al. |
| 7,711,460 B2 | 5/2010 | Yakes et al. |
| 7,874,373 B2 | 1/2011 | Morrow et al. |
| 7,878,750 B2 | 2/2011 | Zhou et al. |
| 7,931,103 B2 | 4/2011 | Morrow et al. |
| 8,337,352 B2 | 12/2012 | Morrow et al. |
| 8,561,735 B2 | 10/2013 | Morrow et al. |
| 8,864,613 B2 | 10/2014 | Morrow et al. |
| 9,132,736 B1 | 9/2015 | Shukla et al. |
| 9,428,042 B2 | 8/2016 | Morrow et al. |
| 9,452,750 B2 | 9/2016 | Shukla et al. |
| 9,492,695 B2 | 11/2016 | Betz et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,908,520 B2 | 3/2018 | Shukla et al. |
| 9,970,515 B2 | 5/2018 | Morrow et al. |
| 10,029,555 B2 | 7/2018 | Kotloski et al. |
| 10,029,556 B2 | 7/2018 | Morrow et al. |
| 10,160,438 B2 | 12/2018 | Shukla et al. |
| 10,239,403 B2 | 3/2019 | Broker et al. |
| 10,267,390 B2 | 4/2019 | Morrow et al. |
| 10,315,643 B2 | 6/2019 | Shukla et al. |
| 10,357,995 B2 | 7/2019 | Palmer et al. |
| 10,421,350 B2 | 9/2019 | Morrow et al. |
| 10,435,026 B2 | 10/2019 | Shively et al. |
| 10,457,134 B2 | 10/2019 | Morrow et al. |
| 10,578,195 B2 | 3/2020 | Steinberger et al. |
| 10,584,775 B2 | 3/2020 | Steinberger et al. |
| 2006/0246794 A1 | 11/2006 | Foster et al. |
| 2006/0276288 A1 | 12/2006 | Iwanaka et al. |
| 2007/0129196 A1* | 6/2007 | Bucknor ............... B60K 6/445 475/5 |
| 2007/0129204 A1* | 6/2007 | Bucknor ............... F16H 3/728 475/275 |
| 2009/0098969 A1* | 4/2009 | Tabata .................. B60K 6/40 475/5 |
| 2018/0326832 A1 | 11/2018 | Kotloski et al. |
| 2019/0111910 A1 | 4/2019 | Shukla et al. |
| 2019/0178350 A1 | 6/2019 | Steinberger et al. |
| 2019/0217698 A1 | 7/2019 | Broker et al. |
| 2019/0242460 A1 | 8/2019 | Morrow et al. |
| 2019/0366828 A1 | 12/2019 | Morrow et al. |
| 2020/0039341 A1 | 2/2020 | Morrow et al. |
| 2020/0200237 A1 | 6/2020 | Steinberger et al. |
| 2020/0200238 A1 | 6/2020 | Steinberger et al. |
| 2020/0316816 A1 | 10/2020 | Messina et al. |
| 2020/0317083 A1 | 10/2020 | Messina et al. |

\* cited by examiner

THREE PLANETARY INLINE EMIVT

CROSS-REFERENCE TO RELATED PATENT APPLICATION

This application claims the benefit of U.S. Provisional Patent Application No. 62/874,402, filed Jul. 15, 2019, which is incorporated herein by reference in its entirety.

BACKGROUND

Internal combustion engine vehicles, hybrid vehicles, and electric vehicles, among other types of vehicles, include transmissions. Traditional vehicle transmissions use gears and gear trains to provide speed and torque conversions from a rotating power source (e.g., an engine, a motor, etc.) to another device (e.g., a drive shaft, wheels of a vehicle, etc.). Transmissions include multiple gear ratios selectively coupled to the rotating power source with a mechanism. The mechanism may also selectively couple an output to the various gear ratios.

SUMMARY

At least one embodiment relates to a drive system for a vehicle. The drive system includes a first planetary gear set, a second planetary gear set, a third planetary gear set, a first electromagnetic device coupled to the first planetary gear set, a second electromagnetic device coupled to the second planetary gear set, and an output shaft coupled to the first planetary gear set. The third planetary gear set includes a sun gear, a ring gear, planetary gears coupling the sun gear to the ring gear, and a carrier rotationally supporting the planetary gears. The ring gear is directly coupled to the first planetary gear set and the second planetary gear set. The sun gear is directly coupled to the second planetary gear set.

Another embodiment relates to a drive system for a vehicle. The drive system includes a first planetary gear set, a second planetary gear set, a third planetary gear set directly coupled to the first planetary gear set and the second planetary gear set, a first electromagnetic device coupled to the first planetary gear set, a second electromagnetic device coupled to the second planetary gear set, and an output shaft coupled to the first planetary gear set. The third planetary gear set is aligned with the first planetary gear set and the second planetary gear set.

Still another embodiment relates to a vehicle including a multi-mode transmission. The multi-mode transmission includes a first planetary gear set, a second planetary gear set, a third planetary gear set coupled to the first planetary gear set and the second planetary gear set, a first motor/generator coupled to the first planetary gear set, and a second motor/generator coupled to the second planetary gear set. The vehicle further includes a drive axle coupled to the first planetary gear set. During a first mode of the multi-mode transmission, (a) a brake is engaged to limit rotation of a carrier of the third planetary gear set, and (b) the third planetary gear set couples a carrier of the first planetary gear set to a ring gear of the second planetary gear set.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a multi-mode inline electromechanical variable transmission is provided as part of a vehicle and is selectively reconfigurable between a plurality of operating modes. The vehicle may also include an engine and one or more tractive elements (e.g., wheel and tire assemblies, etc.). The multi-mode inline electromechanical variable transmission may include a first electromagnetic device and a second electromagnetic device. In one embodiment, at least one of the first electromagnetic device and the second electromagnetic device provides rotational mechanical energy to start the engine. In another embodiment, the engine provides a rotational mechanical energy input to both the first and second electromagnetic devices such that each operates as a generator to generate electrical energy. In still other embodiments, one of the first electromagnetic device and the second electromagnetic device are configured to receive a rotational mechanical energy output from the engine and provide an electrical energy output to power a control system and/or the other electromagnetic device. According to an exemplary embodiment, the multi-mode inline electromechanical variable transmission has a compact design that facilitates direct replacement of traditional inline transmissions (e.g., mechanical transmissions, transmissions without electromagnetic devices, etc.) used in front engine applications. Thus, the multi-mode inline electromechanical variable transmission may be installed during a new vehicle construction or installed to replace a conventional transmission of a front engine vehicle (e.g., as opposed to replacing a traditional midship transfer case, etc.). The multi-mode inline electromechanical variable transmission may additionally or alternatively be installed as part of a rear-engine vehicle (e.g., a bus, etc.).

Figure 1:
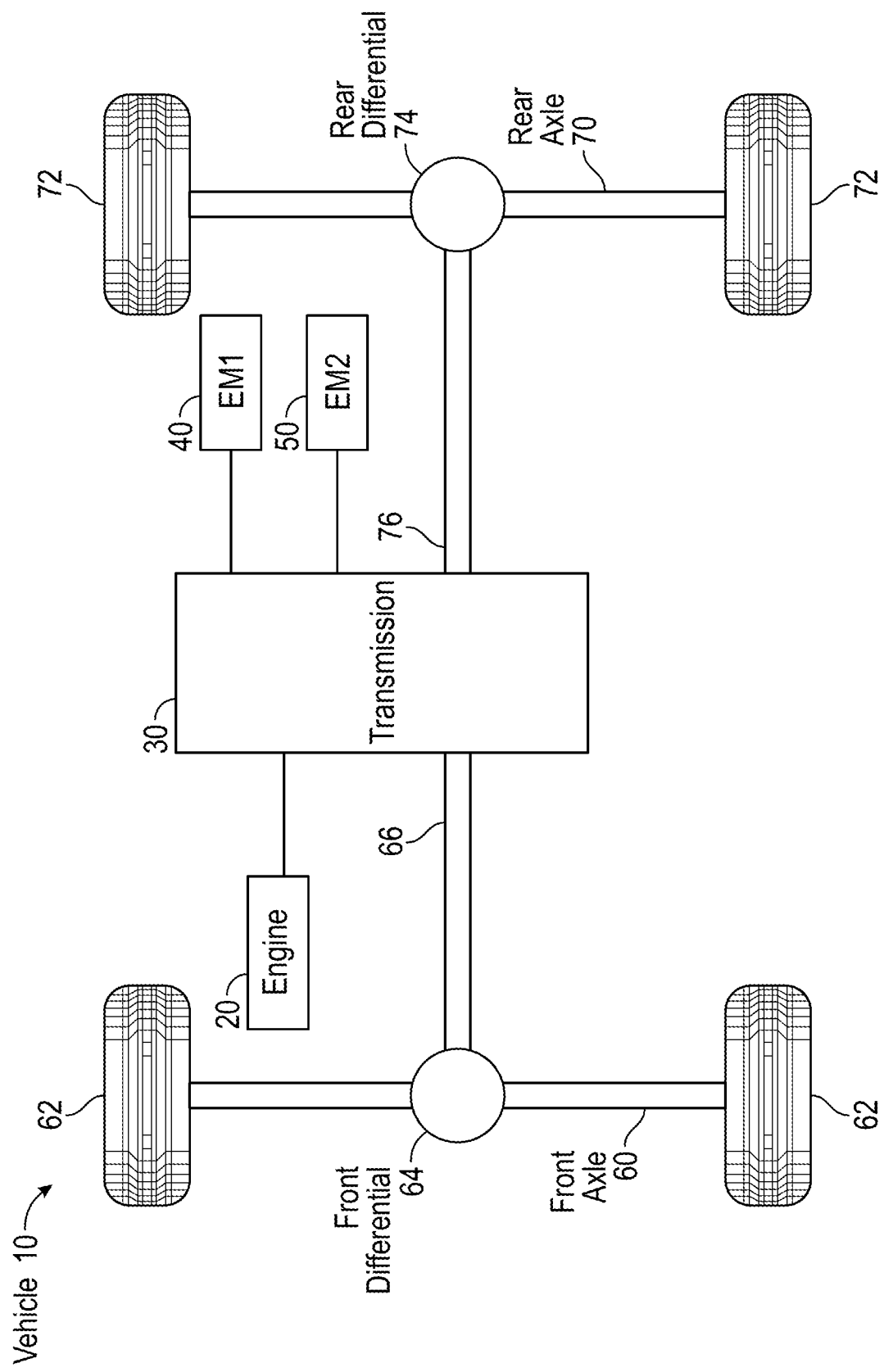
FIG. 1 is a schematic view of a vehicle having a drive train, according to an exemplary embodiment.
Figure 2:
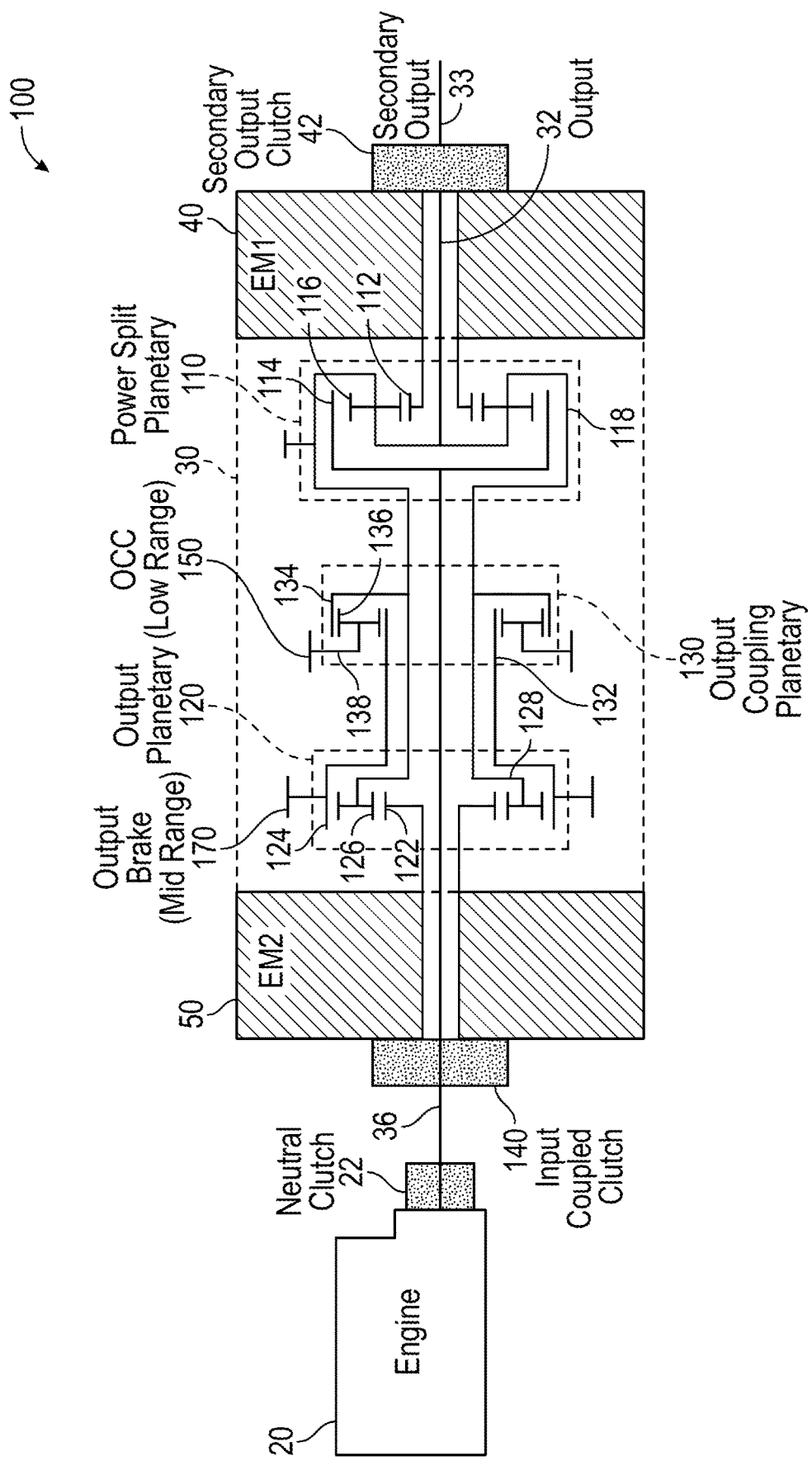
FIG. 2 is a detailed schematic view of the drive train of FIG. 1.

According to the exemplary embodiment shown in FIGS. 1 and 2, a vehicle 10 includes an engine 20 coupled to a transmission, shown as transmission 30. In one embodiment, the engine 20 is configured to combust fuel and provide a mechanical energy input to the transmission 30. By way of example, the engine 20 may be configured to provide a rotational mechanical energy input to the transmission 30. As shown in FIGS. 1 and 2, the transmission 30 includes a first electrical machine, electromagnetic device, and/or motor/generator, shown as first electromagnetic device 40, and a second electrical machine, electromagnetic device, and/or motor/generator, shown as second electromagnetic device 50. According to an exemplary embodiment, the vehicle 10 is configured as a rear engine vehicle and the transmission 30 is configured as a multi-mode inline electromechanical transmission. In other embodiments, the vehicle 10 is configured as a mid-engine vehicle or a front engine vehicle.

Referring again to the exemplary embodiment shown in FIG. 1, the vehicle 10 includes a front axle or drive axle, shown as front axle 60, and a rear axle or drive axle, shown as rear axle 70. As shown in FIG. 1, the front axle 60 includes a pair of tractive elements, shown as tires 62, coupled to a front differential, shown as front differential 64. The rear axle 70 includes a pair of tractive elements, shown as tires 72, coupled to a rear differential, shown as rear differential 74, according to an exemplary embodiment. According to the exemplary embodiment shown in FIG. 1, the front differential 64 is coupled to the transmission 30 with a front axle driveshaft 66, and the rear differential 74 is coupled to the transmission 30 with a rear axle driveshaft 76. While shown as coupled to the tires 62 and the tires 72, the front differential 64 and the rear differential 74 may be coupled to various other types of tractive elements (e.g., tracks, etc.), according to alternative embodiments. As shown in FIG. 1, the front axle driveshaft 66 and the rear axle driveshaft 76 are configured to transport power from the first electromagnetic device 40, the second electromagnetic device 50, and the engine 20 to the tires 62 and the tires 72, respectively. The vehicle 10 may include a plurality of front differentials 64 that may be coupled and/or a plurality of rear differentials 74 that may be coupled, according to various alternative embodiments. In some embodiments, the transmission 30 is selectively coupled (e.g., through a clutch mechanism, coupling mechanism, etc.) to at least one of the front axle driveshaft 66 and the rear axle driveshaft 76 (e.g., to reconfigure the vehicle 10 into a front-wheel-drive configuration, a rear-wheel-drive configuration, an all-wheel-drive configuration, a four-wheel-drive configuration, etc.).

The engine 20 may be any source of rotational mechanical energy that is derived from a stored energy source. The stored energy source is disposed onboard the vehicle 10, according to an exemplary embodiment. The stored energy source may include a liquid fuel or a gaseous fuel, among other alternatives. In one embodiment, the engine 20 includes an internal combustion engine configured to be powered by at least one of gasoline, natural gas, and diesel fuel. According to various alternative embodiments, the engine 20 includes at least one of a turbine, a fuel cell, and an electric motor, or still another device. According to one exemplary embodiment, the engine 20 includes a twelve liter diesel engine capable of providing between approximately 400 horsepower and approximately 600 horsepower and between approximately 400 foot pounds of torque and approximately 2000 foot pounds of torque. In one embodiment, the engine 20 has a rotational speed (e.g., a rotational operational range, etc.) of between 0 and 2,100 revolutions per minute. The engine 20 may be operated at a relatively constant speed (e.g., 1,600 revolutions per minute, etc.). In one embodiment, the relatively constant speed is selected based on an operating condition of the engine 20 (e.g., an operating speed relating to a point of increased fuel efficiency, etc.).

In one embodiment, at least one of the first electromagnetic device 40 and the second electromagnetic device 50 provide a mechanical energy input to another portion of the transmission 30. By way of example, at least one of the first electromagnetic device 40 and the second electromagnetic device 50 may be configured to provide a rotational mechanical energy input to another portion of the transmission 30 (i.e., at least one of the first electromagnetic device 40 and the second electromagnetic device 50 may operate as a motor, etc.). At least one of the first electromagnetic device 40 and the second electromagnetic device 50 may receive a mechanical energy output from at least one of the engine 20 and another portion of the transmission 30. By way of example, at least one of the first electromagnetic device 40 and the second electromagnetic device 50 may be configured to receive a rotational mechanical energy output from at least one of the engine 20 and another portion of the transmission 30 and provide an electrical energy output (i.e., at least one of the first electromagnetic device 40 and the second electromagnetic device 50 may operate as a generator, etc.). According to an exemplary embodiment, the first electromagnetic device 40 and the second electromagnetic device 50 are capable of both providing mechanical energy and converting a mechanical energy input into an electrical energy output (i.e., selectively operate as a motor and a generator, etc.). The operational condition of the first electromagnetic device 40 and the second electromagnetic device 50 (e.g., as a motor, as a generator, etc.) may vary based on a mode of operation associated with the transmission 30.

According to the exemplary embodiment shown in FIG. 2, a drive system for a vehicle, shown as drive system 100, includes the engine 20, the transmission 30, the first electromagnetic device 40, and the second electromagnetic device 50. The transmission 30 may include the first electromagnetic device 40 and the second electromagnetic device 50. As shown in FIG. 2, the transmission 30 includes a first power transmission device or gear set, shown as power split planetary 110, a second power transmission device or gear set, shown as output planetary 120, and a third power transmission device or gear set, shown as output coupling planetary 130. In one embodiment, the power split planetary 110, the output planetary 120, and the output coupling planetary 130 are positioned outside of (e.g., on either side of, sandwiching, not between, etc.) the first electromagnetic device 40 and the second electromagnetic device 50. As shown in FIG. 2, one or more of the power split planetary 110, the output planetary 120, and the output coupling planetary 130 are disposed between (e.g., sandwiched by, etc.) the first electromagnetic device 40 and the second electromagnetic device 50.

Referring to the exemplary embodiment shown in FIG. 2, the power split planetary 110 is a planetary gear set that includes a sun gear 112, a ring gear 114, and a plurality of planetary gears 116. The plurality of planetary gears 116 couple the sun gear 112 to the ring gear 114, according to an exemplary embodiment. As shown in FIG. 2, a carrier 118 rotationally supports the plurality of planetary gears 116. In one embodiment, the first electromagnetic device 40 is directly coupled to the sun gear 112 such that the power split planetary 110 is coupled to the first electromagnetic device 40. By way of example, the first electromagnetic device 40 may include or be coupled to a shaft (e.g., a first shaft, an input shaft, an output shaft, etc.) directly coupled to the sun gear 112.

Referring still to the exemplary embodiment shown in FIG. 2, the output planetary 120 is a planetary gear set that includes a sun gear 122, a ring gear 124, and a plurality of planetary gears 126. The plurality of planetary gears 126 couple the sun gear 122 to the ring gear 124, according to an exemplary embodiment. As shown in FIG. 2, a carrier 128 rotationally supports the plurality of planetary gears 126. In one embodiment, the second electromagnetic device 50 is directly coupled to the sun gear 122 such that the output planetary 120 is coupled to the second electromagnetic device 50. By way of example, the second electromagnetic device 50 may include or be coupled to a shaft (e.g., a second shaft, an input shaft, an output shaft, etc.) directly coupled to the sun gear 122. The carrier 118 is directly coupled to the carrier 128, thereby coupling the power split planetary 110 to the output planetary 120, according to the exemplary embodiment shown in FIG. 2. In one embodiment, directly coupling the carrier 118 to the carrier 128 synchronizes the rotational speeds of the carrier 118 and the carrier 128.

Referring still to the exemplary embodiment shown in FIG. 2, the output coupling planetary 130 is a planetary gear set that includes a sun gear 132, a ring gear 134, and a plurality of planetary gears 136. The plurality of planetary gears 136 couple the sun gear 132 to the ring gear 134, according to an exemplary embodiment. As shown in FIG. 2, a carrier 138 rotationally supports the plurality of planetary gears 136. In one embodiment, the sun gear 132 is directly rotationally coupled to (e.g., fixed directly to) the ring gear 124 such that the output coupling planetary 130 is directly coupled to the output planetary 120. The ring gear 134 is directly rotationally coupled to the carrier 118 and the carrier 128, thereby coupling the power split planetary 110 and the output planetary 120 to the output coupling planetary 130, according to the exemplary embodiment shown in FIG. 2. Accordingly, the ring gear 124 of the output planetary 120 is coupled to the carrier 118 and the carrier 128 through the output coupling planetary 130. In some embodiments, the carrier 118 and/or the carrier 128 extend through the output coupling planetary 130. In some embodiments, the output coupling planetary 130 is positioned between the output planetary 120 and the power split planetary 110.

The carrier 118 is directly rotationally coupled to an output with a first shaft, shown as output shaft 32, according to the exemplary embodiment shown in FIG. 2. A second shaft, shown as secondary output shaft 33, is selectively coupled to the output shaft 32 by a clutch, shown as secondary output clutch 42, according to the exemplary embodiment shown in FIG. 2. The secondary output shaft 33 may be coupled to at least one of the rear axle driveshaft 76 and the front axle driveshaft 66. By way of example, the secondary output shaft 33 may be coupled to a transfer case and/or the rear axle driveshaft 76 where the transmission 30 is installed in place of a traditional, mechanical, straight-thru transmission. In another embodiment, the output is a power take-off (PTO) output, and the secondary output shaft 33 is coupled thereto. A clutch assembly may be engaged and disengaged to selectively couple at least one of the front axle driveshaft 66, a transfer case, and the rear axle driveshaft 76 to the secondary output shaft 33 (e.g., to facilitate operation of a vehicle in a rear-wheel-drive mode, an all-wheel-drive mode, a four-wheel-drive mode, a front-wheel-drive mode, etc.). In other embodiments, the secondary output shaft 33 and the secondary output clutch 42 are omitted, and the output shaft 32 is directly coupled to the output.

As shown in FIG. 2, the transmission 30 includes a shaft, shown as connecting shaft 36. A clutch, shown as neutral clutch 22, is positioned to selectively couple the engine 20 to connecting shaft 36. The neutral clutch 22 may be a component of the engine 20 or the transmission 30 or a separate component. According to an exemplary embodiment, the neutral clutch 22 and connecting shaft 36 directly couple the engine 20 to the power split planetary 110. In one embodiment, the neutral clutch 22 and connecting shaft 36 directly couple the engine 20 with the ring gear 114 of the power split planetary 110. According to an alternative embodiment, the neutral clutch 22 is omitted, and connecting shaft 36 is directly coupled to the engine 20.

As shown in FIG. 2, the transmission 30 includes a first clutch, shown as input coupled clutch 140. The input coupled clutch 140 is positioned to selectively couple the second electromagnetic device 50 with the engine 20 and the connecting shaft 36, according to an exemplary embodiment. The input coupled clutch 140 may thereby selectively couple the engine 20 to the output planetary 120. As shown in FIG. 2, the connecting shaft 36 extends from the neutral clutch 22, through the input coupled clutch 140 and the second electromagnetic device 50, and through the output planetary 120 and the output coupling planetary 130 to the power split planetary 110. The input coupled clutch 140 may selectively couple the second electromagnetic device 50 with connecting shaft 36. Accordingly, the input coupled clutch 140 may selectively couple the connecting shaft 36 to the sun gear 122 of the output planetary 120. According to an exemplary embodiment, the first electromagnetic device 40 and the second electromagnetic device 50 (e.g., input/output shafts thereof, etc.) are aligned (e.g., radially aligned, etc.) with the power split planetary 110, the output planetary 120, the output coupling planetary 130, the connecting shaft 36, the output shaft 32, and/or the secondary output shaft 33 (e.g., centerlines thereof are aligned, to thereby form a straight-thru or inline transmission arrangement, etc.).

According to the exemplary embodiment shown in FIG. 2, the transmission 30 further includes a second clutch or brake, shown as output coupled clutch 150. The output coupled clutch 150 is positioned to selectively inhibit movement of the carrier 138 (e.g., by coupling the carrier 138 to a housing of the transmission 30), according to an exemplary embodiment. When the movement of the carrier 138 is limited (e.g., prevented), the sun gear 132 is coupled to the ring gear 134 through the plurality of planetary gears 136 such that a rotation of the sun gear 132 causes a corresponding rotation of the ring gear 134. Accordingly, the output coupled clutch 150 may thereby selectively couple the ring gear 124 to the carrier 118 and the carrier 128.

The transmission 30 may further include a third clutch or neutral disconnect clutch, shown in FIG. 2 as secondary output clutch 42. The secondary output clutch 42 is positioned to selectively couple the output shaft 32 with the secondary output shaft 33, according to an exemplary embodiment. The secondary output clutch 42 may thereby selectively couple the carrier 118 and the carrier 128 to the secondary output shaft 33. As shown in FIG. 2, the output shaft 32 extends from the power split planetary 110, through the first electromagnetic device 40, and out to the secondary output clutch 42. In other embodiments, the secondary output clutch 42 is omitted.

In some embodiments, the neutral clutch 22 is biased into an engaged position (e.g., with a spring, etc.) and selectively disengaged (e.g., with application of pressurized hydraulic fluid, etc.). In some embodiments, the input coupled clutch 140 is biased into a disengaged position (e.g., with a spring, etc.) and selectively engaged (e.g., with application of pressurized hydraulic fluid, etc.). In some embodiments, the output coupled clutch 150 is biased into a disengaged position (e.g., with a spring, etc.) and selectively engaged (e.g., with application of pressurized hydraulic fluid, etc.). In some embodiments, the secondary output clutch 42 is biased into an engaged position (e.g., with a spring, etc.) and selectively disengaged (e.g., with application of pressurized hydraulic fluid, etc.). In other embodiments, one or more of the neutral clutch 22, the input coupled clutch 140, the output coupled clutch 150, and the secondary output clutch 42 are hydraulically-biased and spring released.

Referring again to the exemplary embodiment shown in FIG. 2, the transmission 30 includes a brake, shown as output brake 170. The output brake 170 is positioned to selectively inhibit the movement of at least a portion of the output planetary 120 (e.g., the ring gear 124, etc.), according to an exemplary embodiment. In one embodiment, the output brake 170 is biased into a disengaged position (e.g., with a spring, etc.) and selectively engaged (e.g., with application of pressurized hydraulic fluid, etc.). In other embodiments, the output brake 170 is hydraulically-biased and spring released. In still other embodiments, the components of the transmission 30 are still otherwise engaged and disengaged (e.g., pneumatically, etc.). By way of example, the output brake 170 and the output coupled clutch 150 may be engaged simultaneously, providing a driveline brake such that rotational movement of at least one of the output coupling planetary 130 (e.g., the sun gear 132, the ring gear 134, the plurality of planetary gears 136, and the carrier 138, etc.), the output planetary 120 (e.g., the ring gear 124, etc.), the power split planetary 110 (e.g., the carrier 118, etc.), and the output shaft 32 are selectively limited.

Figure 3:
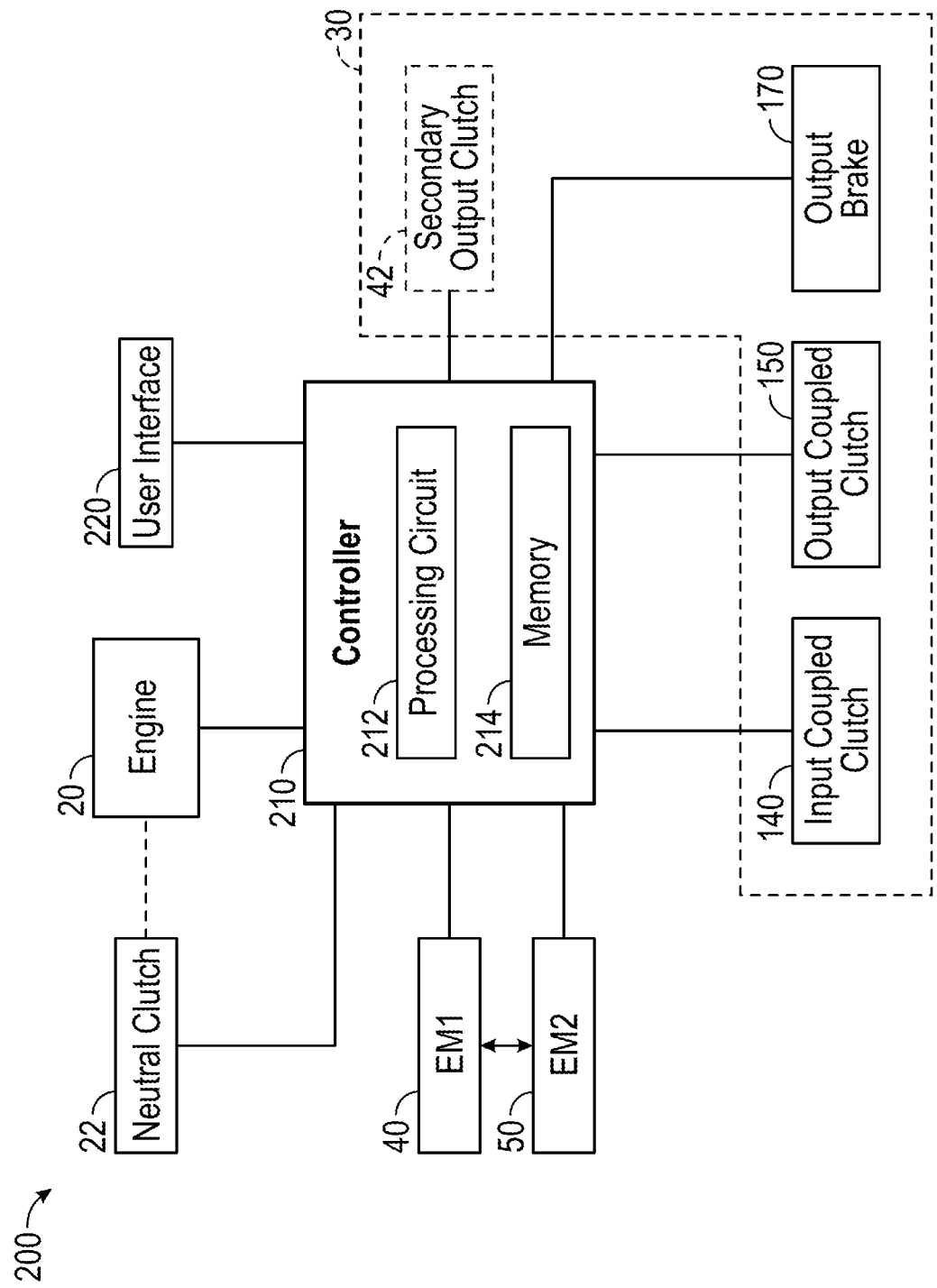
FIG. 3 is a schematic diagram of a control system for the drive train of FIG. 1.

According to the exemplary embodiment shown in FIG. 3, a control system 200 for a vehicle (e.g., the vehicle 10, etc.) includes a controller 210. In one embodiment, the controller 210 is configured to selectively engage, selectively disengage, or otherwise communicate with components of the vehicle 10 according to various modes of operation. As shown in FIG. 3, the controller 210 is coupled to the engine 20. In one embodiment, the controller 210 is configured to selectively engage the engine 20 (e.g., interface with a throttle thereof, etc.) such that an output of the engine 20 rotates at a target rate. The controller 210 is coupled to the first electromagnetic device 40 and the second electromagnetic device 50, according to an exemplary embodiment, and may send and receive signals therewith. By way of example, the controller 210 may send command signals relating to at least one of a target mode of operation, a target rotational speed, and a target rotation direction for the first electromagnetic device 40 and the second electromagnetic device 50. As shown in FIG. 3, the first electromagnetic device 40 and the second electromagnetic device 50 are electrically coupled (e.g., by an electrical power transmission system, etc.). By way of example, power generated by the first electromagnetic device 40 may be utilized by the second electromagnetic device 50 (e.g., to provide an output torque as a motor, etc.), or power generated by the second electromagnetic device 50 may be utilized by the first electromagnetic device 40 (e.g., to provide an output torque as a motor, etc.). The controller 210 is configured to selectively engage and selectively disengage the neutral clutch 22, the secondary output clutch 42, the input coupled clutch 140, the output coupled clutch 150, and the output brake 170 directly or by interacting with another component (e.g., a pump, a valve, a solenoid, a motor, etc.).

According to an exemplary embodiment, the drive system 100 includes an energy storage device (e.g., a battery, etc.). In such embodiments, the battery may be charged and recharged by an electromagnetic device that is generating power. The battery may supply the electromagnetic device that is motoring the vehicle to propel the vehicle. In some embodiments, the battery may always be utilized as part of the drive system 100. In other embodiments, the battery may be used only when excess generated power must be stored or excess power is required to motor the vehicle.

According to alternative embodiments, the drive system 100 may be configured to operate with the first electromagnetic device 40 and the second electromagnetic device 50, and no additional sources of electrical power. Additional sources of electrical power include, for example, a battery and other energy storage devices. Without an energy storage device, the first electromagnetic device 40 and the second electromagnetic device 50 may operate in power balance. One of the electromagnetic devices may provide all of the electrical power required by the other electromagnetic device (as well as the electrical power required to offset power losses). The first electromagnetic device 40 and the second electromagnetic device 50 may operate without doing either of (a) providing electrical power to an energy storage device or (b) consuming electrical power from an energy storage device. Thus, the sum of the electrical power produced or consumed by the first electromagnetic device 40, the electrical power produced or consumed by the second electromagnetic device 50, and electrical power losses may be zero. According to the embodiment of FIGS. 1-3, two electromagnetic devices are shown. In other embodiments, the drive system 100 includes three or more electromagnetic devices.

According to the exemplary embodiment shown in FIG. 3, the control system 200 includes a user interface 220 that is coupled to the controller 210. In one embodiment, the user interface 220 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may be configured to also display a current mode of operation, various potential modes of operation, or still other information relating to the transmission 30 and/or drive system 100. By way of example, the graphical user interface may be configured to provide specific information regarding the operation of drive system 100 (e.g., whether the neutral clutch 22, the secondary output clutch 42, the input coupled clutch 140, the output coupled clutch 150, and/or the output brake 170 are engaged or disengaged, a fault condition where at least one of the neutral clutch 22, the secondary output clutch 42, the input coupled clutch 140, the output coupled clutch 150, and/or the output brake 170 fail to engage or disengage in response to a command signal, etc.).

The operator input may be used by an operator to provide commands to at least one of the engine 20, the transmission 30, the first electromagnetic device 40, the second electromagnetic device 50, and drive system 100 or still another component of the vehicle. The operator input may include one or more buttons, knobs, touchscreens, switches, levers, or handles. In one embodiment, an operator may press a button to change the mode of operation for at least one of the transmission 30, and drive system 100, and the vehicle. The operator may be able to manually control some or all aspects of the operation of the transmission 30 using the display and the operator input. It should be understood that any type of display or input controls may be implemented with the systems and methods described herein.

According to the exemplary embodiment shown in FIG. 3, the controller 210 includes a, shown as processor 212, and a memory 214. In some embodiments, the processor 212 is configured to execute computer code stored in the memory 214 to facilitate the activities described herein. The memory 214 includes various actuation profiles corresponding to modes of operation (e.g., for the transmission 30, for drive system 100, for a vehicle, etc.), according to an exemplary embodiment.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory 214 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 214 may be or include volatile memory or non-volatile memory, and may include database components, object code components, script components, or any other type of information structure for supporting the various activities and information structures described in the present disclosure. According to an exemplary embodiment, the memory 214 is communicably connected to the processor 212 via a processing circuit and includes computer code for executing (e.g., by the processing circuit or the processor 212) the one or more processes described herein.

Referring next to the exemplary embodiments shown in FIGS. 4-12, the transmission 30 is configured to operate according to a plurality of modes of operation. Various modes of operation for the transmission 30 are identified below in Table 1. In other embodiments, a vehicle having the transmission 30 is configured to operate according to the various modes of operation shown in FIGS. 4-12 and identified below in Table 1.

TABLE 1

| Mode of Operation | Neutral Clutch 22 | Secondary Output Clutch 42 | Output Coupled Clutch 150 | Output Brake 170 | Input Coupled Clutch 140 |
|---|---|---|---|---|---|
| Mid Speed | X | X | | X | |
| Reverse Low Speed | X | X | X | | |
| Reverse Power Generation | X | X | | | X |
| Vehicle Start | X | X | X | X | |
| Low Range | X | X | X | | |
| Mid Range | X | X | | X | |
| Shift | X | X | | X | X |
| High Range | X | X | | | X |

As shown in Table 1, an "X" represents a component of the drive system 100 (e.g., the output brake 170, the input coupled clutch 140, etc.) that is engaged or closed during the respective modes of operation.

In each of the modes shown in Table 1 and FIGS. 4-12, the neutral clutch 22 is engaged. When engaged, the neutral clutch 22 couples the engine 20 to the transmission 30. When disengaged, the neutral clutch 22 decouples the engine 20 from the transmission 30. Accordingly, the neutral clutch 22 may be used to isolate the engine 20 from the transmission 30. The neutral clutch 22 may facilitate maintenance or towing of the vehicle 10. Further, with the neutral clutch 22 disengaged, the first electromagnetic device 40 and/or the second electromagnetic device 50 may be used to drive the output shaft 32 independent of the engine 20 (e.g., without the engine 20 running or being rotated by the first electromagnetic device 40 or the second electromagnetic device 50).

In each of the modes shown in Table 1 and FIGS. 4-12, the secondary output clutch 42 is engaged. When engaged, the secondary output clutch 42 couples the output shaft 32 to the secondary output shaft 33, such that driving the output shaft 32 also drives the secondary output shaft 33. When disengaged, the secondary output clutch 42 decouples the output shaft 32 from the secondary output shaft 33. Accordingly, the secondary output clutch 42 may be used to isolate the transmission 30 from the front axle driveshaft 66 and the rear axle driveshaft 76, preventing the transmission 30 from driving the tires 62 and the tires 72. The secondary output clutch 42 may facilitate maintenance or towing. Further, the secondary output clutch 42 may facilitate a high power export power mode or a power takeoff mode where the transmission 30 drives a component (e.g., a pump, an actuator, etc.) without driving the tires 62 or the tires 72.

Figure 4:
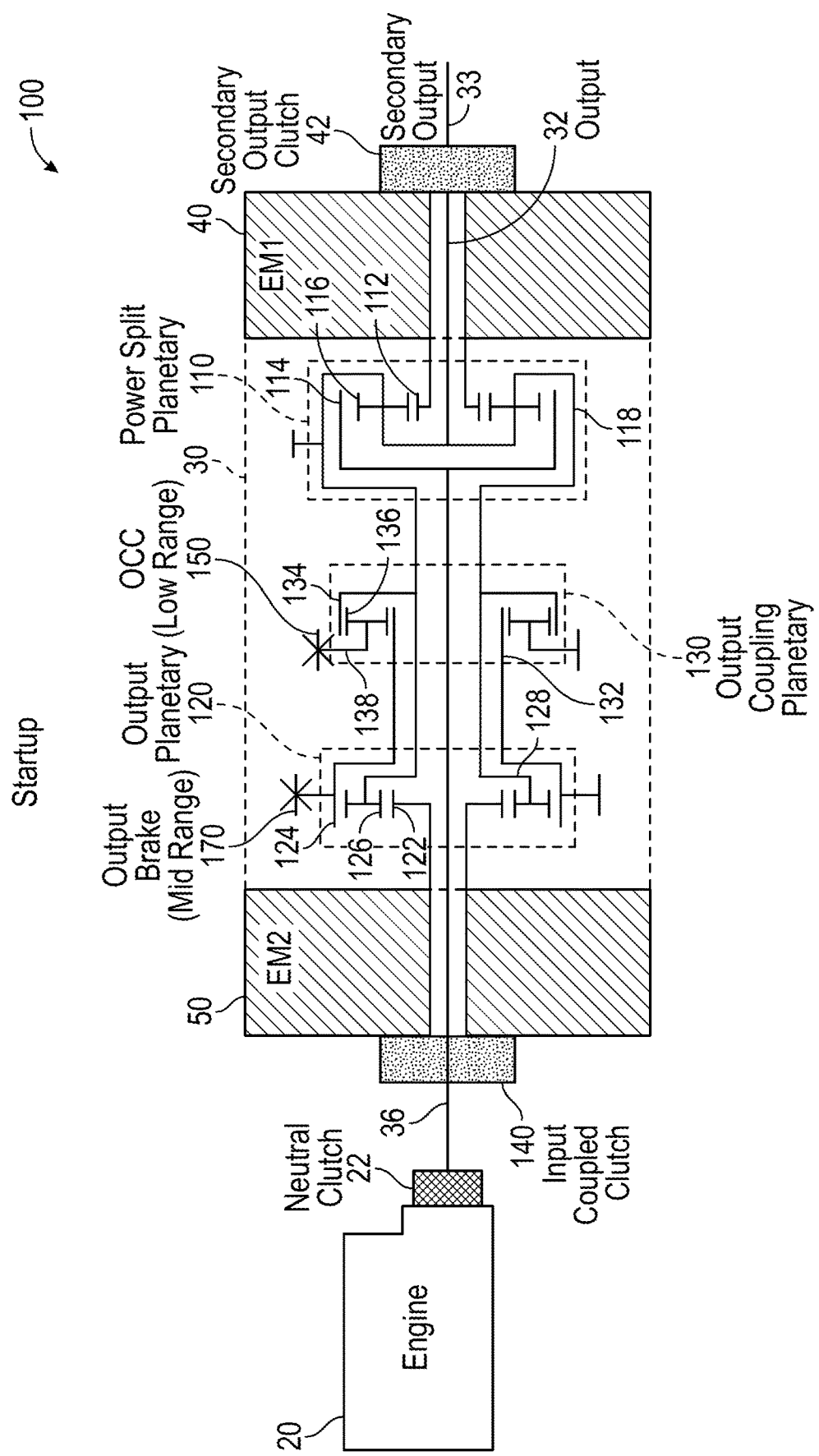
FIG. 4 is a detailed schematic view of the drive train of FIG. 1 configured in a startup mode of operation.
Figure 5:
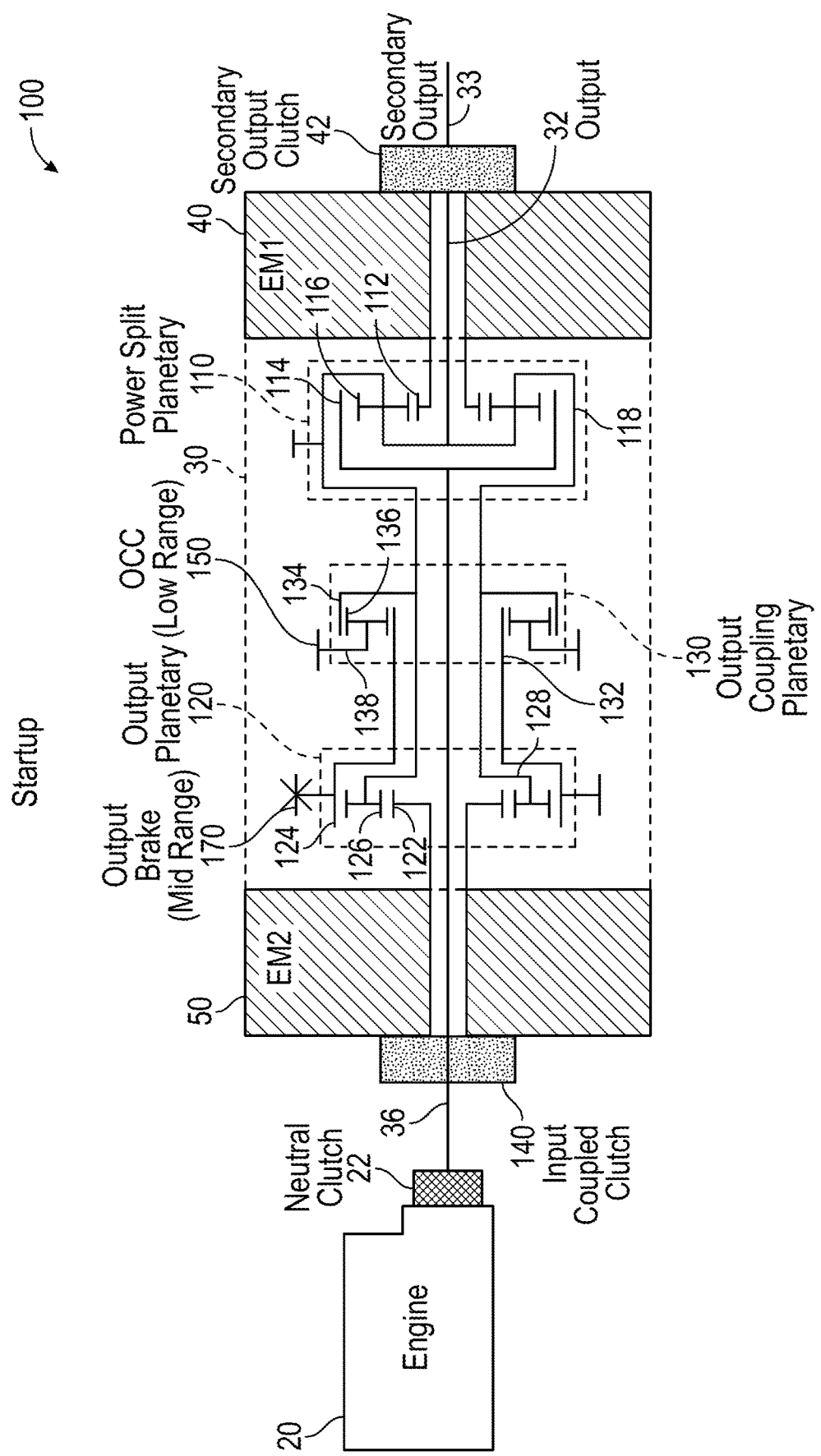
FIG. 5 is a detailed schematic view of the drive train of FIG. 1 configured in a startup mode of operation, according to another exemplary embodiment.

As shown in FIGS. 4 and 5, the transmission 30 is selectively reconfigured into startup modes. In one embodiment, at least one of the first electromagnetic device 40 and the second electromagnetic device 50 include and/or are coupled to an energy storage device (e.g., a capacitor, a battery, etc.) configured to store energy (e.g., electrical energy, chemical energy, etc.) associated with drive system 100. In one embodiment, rotation of the first electromagnetic device 40 rotates connecting shaft 36 to start the engine 20 (e.g., with the neutral clutch 22, the output coupled clutch 150, and the output brake 170 engaged, etc.). In another embodiment, rotation of the second electromagnetic device 50 rotates connecting shaft 36 to start the engine 20 (e.g., with the neutral clutch 22 and the input coupled clutch 140 engaged, etc.). The first electromagnetic device 40 or the second electromagnetic device 50 may be configured to use the stored energy to start the engine 20 by providing a rotational mechanical energy input (e.g., a torque, etc.) to the engine 20 through connecting shaft 36.

In an alternative embodiment, the engine 20 includes a traditional starting mechanism (e.g., a starter motor, etc.) configured to start the engine 20 (e.g., in response to a vehicle start request, in response to an engine start request, etc.). The vehicle start request and/or the engine start request may include a directive to turn the engine "on" from an "off" state. The vehicle may include at least one of a pushbutton, a graphical user interface, an ignition, and another device with which a user interacts to provide or trigger the vehicle start request and/or the engine start request. The engine 20 may provide a rotational mechanical energy input to at least one of the first electromagnetic device 40 and/or the second electromagnetic device 50. The first electromagnetic device 40 and the second electromagnetic device 50 may be brought up to a threshold (e.g., a threshold speed, a threshold speed for a target period of time, a threshold power generation, a threshold power generation for a target period of time, etc.) that establishes a requisite DC bus voltage for controlling the first electromagnetic device 40 and/or the second electromagnetic device 50. Both the first electromagnetic device 40 and the second electromagnetic device 50 may thereafter be activated and controlled within and/or to desired states. The power electronics of the control system 200 that control the motor-to-motor functions may be brought online during the startup mode.

As shown in FIG. 4 and Table 1, the neutral clutch 22, the output coupled clutch 150, and the output brake 170 are engaged when the transmission 30 is configured in the startup mode. According to an exemplary embodiment, engaging the neutral clutch 22, the output brake 170, and the output coupled clutch 150 selectively limits the rotational movement of portions of both the power split planetary 110 and the output planetary 120. By way of example, engaging the output brake 170 may inhibit the rotational movement of the ring gear 124 and the sun gear 132 such that each remains rotationally fixed. Engaging the output coupled clutch 150 may inhibit rotational movement of the carrier 138 such that carrier 138 remains rotationally fixed. With the carrier 138 and the sun gear 132 rotationally fixed, the ring gear 134 and the carrier 118 become rotationally fixed, thereby isolating the output shaft 32 from the engine 20, the first electromagnetic device 40, and the second electromagnetic device 50 in the startup mode. Such isolation may substantially eliminate a forward lurch potential of the vehicle during startup (e.g., the transmission 30 does not provide an output torque to tires 62 and/or tires 72, etc.). Alternatively, as shown in FIG. 5, the output coupled clutch 150 may be disengaged (e.g., before startup, during startup, after startup, etc.). However, disengaging the output coupled clutch 150 may not prevent rotation of the ring gear 134 and thereby the output shaft 32. In some embodiments, the second electromagnetic device is held stationary to prevent rotation of the output shaft 32 in the startup mode shown in FIG. 5. In other embodiments, the startup mode shown in FIG. 5 is a neutral configuration (e.g., free movement of the output shaft 32 is permitted though control of the first electromagnetic device 40 and/or the second electromagnetic device 50). In such embodiments, the startup mode may provide a true neutral for the transmission 30.

According to an exemplary embodiment, an energy flow path in the startup mode includes: the first electromagnetic device 40 providing a rotational mechanical energy input to the sun gear 112 that is received by the plurality of planetary gears 116; the plurality of planetary gears 116 rotating about central axes thereof (e.g., the planetary gears 116 may not rotate about the sun gear 112 because the carrier 118 may be rotationally fixed, etc.); the plurality of planetary gears 116 conveying the rotational mechanical energy to the ring gear 114; and the ring gear 114 transferring the rotational mechanical energy to the neutral clutch 22 through the connecting shaft 36 such that the rotational mechanical energy provided by the first electromagnetic device 40 starts the engine 20.

An alternative energy flow path in the startup mode may include starting the engine 20 with a traditional starting mechanism, the engine 20 providing a rotational mechanical energy input to the ring gear 114 that is received by the plurality of planetary gears 116; the plurality of planetary gears 116 rotating about central axes thereof (e.g., the planetary gears 116 may or may not rotate about the sun gear 112 because the carrier 118 may or may not be rotationally fixed, etc.); the plurality of planetary gears 116 conveying the rotational mechanical energy to the sun gear 112; and the sun gear 112 conveying the rotational mechanical energy to the first electromagnetic device 40 to bring the first electromagnetic device 40 up to the threshold for establishing a requisite DC bus voltage and controlling the first electromagnetic device 40 and/or the second electromagnetic device 50 in a desired state. By way of example, the startup mode may be used to start the engine 20, establish a requisite DC bus voltage, or otherwise export power without relying on the controller 210 to engage the first electromagnetic device 40 and/or the second electromagnetic device 50. The transmission 30 may provide increased export power potential relative to traditional transmission systems.

Figure 6:
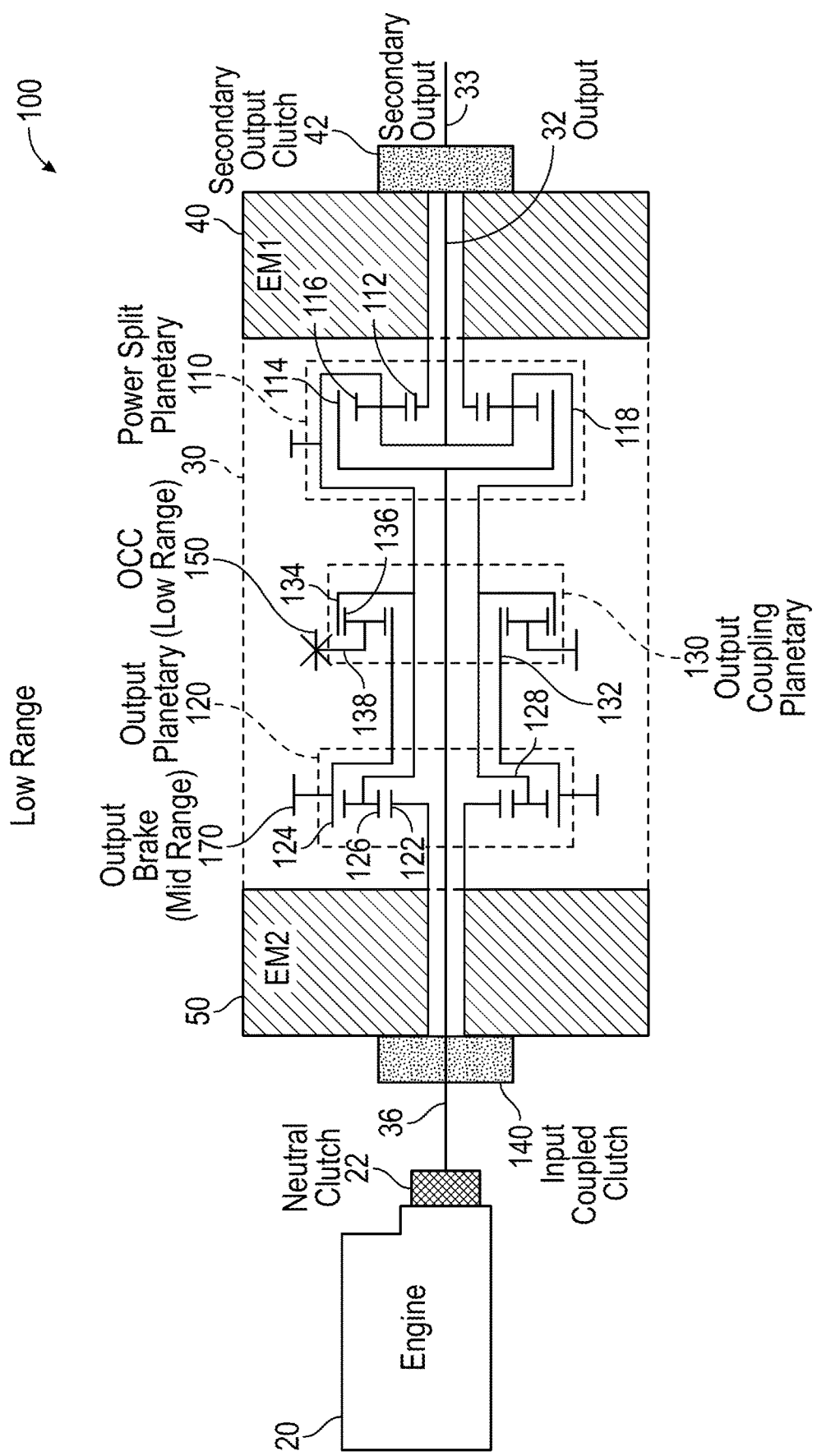
FIG. 6 is a detailed schematic view of the drive train of FIG. 1 configured in a low range mode of operation.

As shown in FIG. 6, the transmission 30 is selectively reconfigured into a low range mode of operation such that the transmission 30 allows for a low output speed operation with a high output torque (e.g., in a forward direction of travel, etc.). The low range mode increases a vehicle's gradability (e.g., facilitates the vehicle maintaining speed on a grade, etc.). In one embodiment, the engine 20 provides a rotational mechanical energy input to the transmission 30 such that the first electromagnetic device 40 generates electrical power and the second electromagnetic device 50 uses the generated electrical power to provide a rotational mechanical energy output. As such, at least one of the engine 20 and the second electromagnetic device 50 provide a rotational mechanical energy input to drive at least one of tires 62 and tires 72. In an alternative embodiment, the first electromagnetic device 40 operates as a motor and the second electromagnetic device 50 operates as a generator when the transmission 30 is configured in the low range forward mode. In still another alternative embodiment, both the first electromagnetic device 40 and the second electromagnetic device 50 operate as a generator in the low range forward mode. In yet another embodiment, the transmission 30 is not selectively reconfigurable into the low range mode of operation. In one such embodiment, the transmission 30 does not include the sun gear 132, the ring gear 134, the plurality of planetary gears 136, and the carrier 138 and does not include the output coupled clutch 150.

As shown in FIG. 6 and Table 1, the neutral clutch 22 and the output coupled clutch 150 are engaged when the transmission 30 is configured in the low range mode. As shown in FIG. 6, the output coupled clutch 150 inhibits the rotation of the carrier 138. Accordingly, when the engine 20 provides a rotational mechanical energy input to the transmission 30, at least one of the engine 20 and the second electromagnetic device 50 drive the output shaft 32 through the interaction of the connecting shaft 36 and the output coupling planetary 130 with the power split planetary 110, respectively. According to the exemplary embodiment shown in FIG. 6, an energy flow path for the low range includes: the engine 20 providing a rotational mechanical energy input to the connecting shaft 36 through the neutral clutch 22; the connecting shaft 36 conveying the rotational mechanical energy to the ring gear 114; the ring gear 114 causing the plurality of planetary gears 116 to rotate about central axes thereof, as well as about the sun gear 112 such that the carrier 118 and the output shaft 32 rotate; and the rotation of the plurality of planetary gears 116 about a central axis causing a rotation of the sun gear 112, thus driving the first electromagnetic device 40 such that it operates as a generator (e.g., generates electrical energy, etc.).

Referring still to FIG. 6, the rotation of the carrier 118 drives both the carrier 128 and the ring gear 134. The carrier 128 drives the plurality of planetary gears 126 to rotate about the sun gear 122 and about central axes thereof. In one embodiment, the second electromagnetic device 50 receives electrical energy generated by the first electromagnetic device 40. Accordingly, the second electromagnetic device 50 operates as a motor, providing a rotational mechanical energy input to the sun gear 122. The sun gear 122 conveys the rotational mechanical energy to the plurality of planetary gears 126 such that each further rotates about the central axis thereof. The plurality of planetary gears 126 drive the ring gear 124, and the rotation of the ring gear 124 the sun gear 132. According to the exemplary embodiment shown in FIG. 6, the plurality of planetary gears 136 rotate about central axes thereof (e.g., without rotating about the sun gear 132) and convey rotational mechanical energy to the ring gear 134 with the output coupled clutch 150 engaged. The ring gear 134 applies a torque to the carrier 118 to drive the output shaft 32. As such, the engine 20 and the second electromagnetic device 50 move a vehicle at a low speed with a high output torque.

Figure 7:
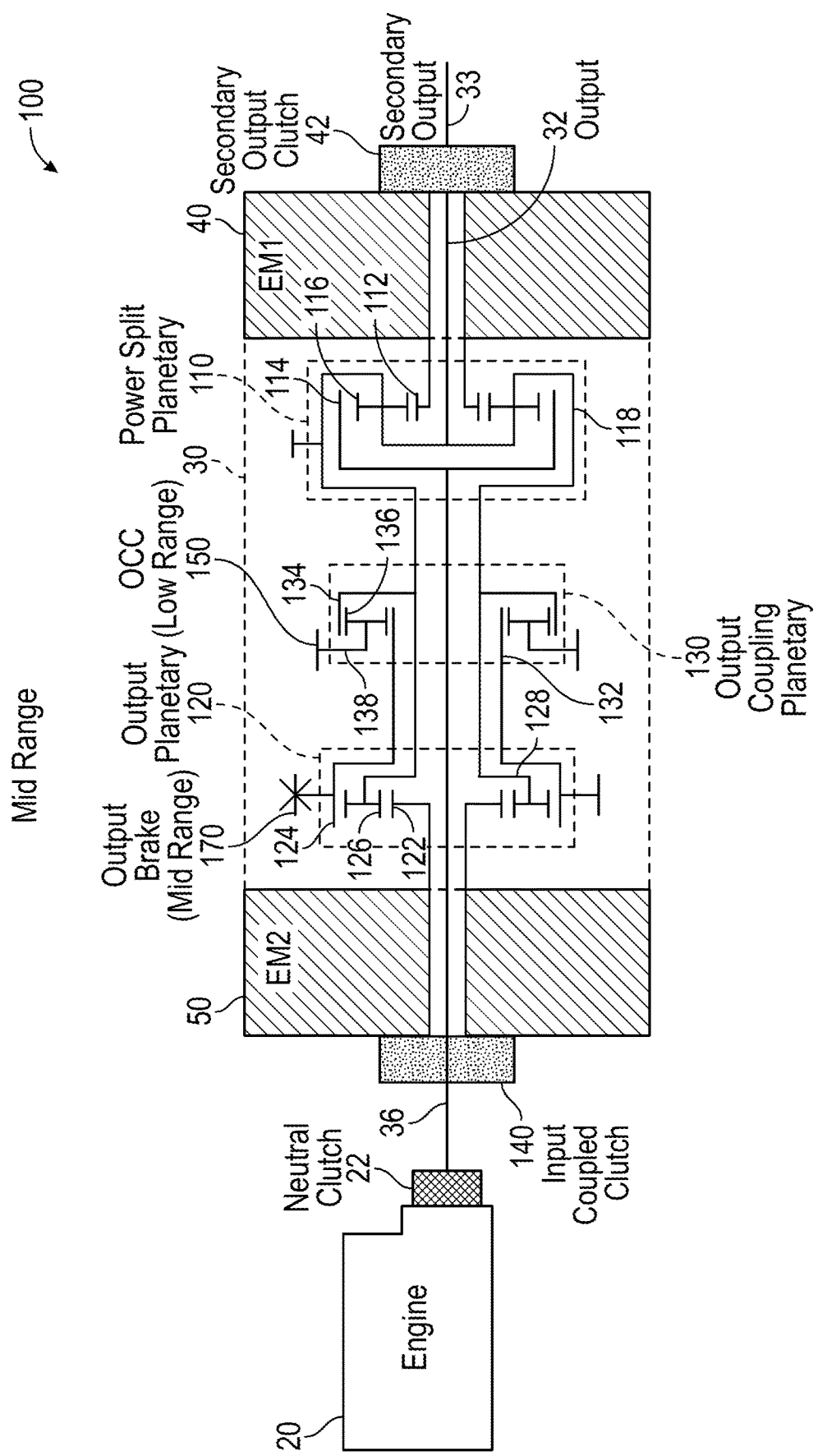
FIG. 7 is a detailed schematic view of the drive train of FIG. 1 configured in a mid range mode of operation.

As shown in FIG. 7, the transmission 30 is selectively reconfigured into a mid range mode of operation. In the mid range mode of operation, the transmission 30 may facilitate a mid range output speed operation (e.g., in a forward direction of travel, etc.). The speed range associated with the mid range mode of operation may be larger than that of traditional transmissions (i.e., the transmission 30 may provide increased coverage in the mid range, etc.). The mid range mode may improve low output speed torque and high output speed power. In one embodiment, the engine 20 provides a rotational mechanical energy input such that the first electromagnetic device 40 generates electrical power, and the second electromagnetic device 50 uses the generated electrical power to provide a rotational mechanical energy output. The second electromagnetic device 50 thereby provides a rotational mechanical energy input to drive at least one of tires 62 and tires 72. In an alternative embodiment, the second electromagnetic device 50 operates as a generator while the first electromagnetic device 40 operates as a motor when the transmission 30 is configured in the mid range mode. In still another alternative embodiment, both the first electromagnetic device 40 and the second electromagnetic device 50 operate as a generator in the mid range mode.

As shown in FIG. 7 and Table 1, the neutral clutch 22 and the output brake 170 are engaged when the transmission 30 is configured in the mid range mode. As shown in FIG. 7, the output brake 170 inhibits the rotation of (e.g., rotationally fixes) the ring gear 124 and the sun gear 132. In one embodiment, engaging the output brake 170 substantially eliminates a power dip between output and input modes of the transmission 30. According to the exemplary embodiment shown in FIG. 7, an energy flow path for the mid range forward mode includes: the engine 20 providing a rotational mechanical energy input to connecting shaft 36 that is conveyed to the ring gear 114; the ring gear 114 driving the plurality of planetary gears 116 to rotate about central axes thereof, as well as about the sun gear 112 such that both the carrier 118 and the sun gear 112 rotate; and the rotation of the carrier 118 driving the output shaft 32.

With the ring gear 124 fixed by the output brake 170, the second electromagnetic device 50 may operate as a motor. In one embodiment, the second electromagnetic device 50 receives electrical energy generated by the first electromagnetic device 40. The first electromagnetic device 40 operates as a generator, removing a rotational mechanical energy from the sun gear 112. The sun gear 122 conveys rotational mechanical torque from the second electromagnetic device 50 to the plurality of planetary gears 126 such that each further rotates about the sun gear 122 (e.g., at an increased rotational speed, etc.). The rotation of the plurality of planetary gears 126 (e.g., effected by the sun gear 122, etc.) drives the carrier 128 and thereby the carrier 118. The carrier 118 drives the output shaft 32 at a mid range output speed and may thereby drive a vehicle at a mid range output speed.

Figure 8:
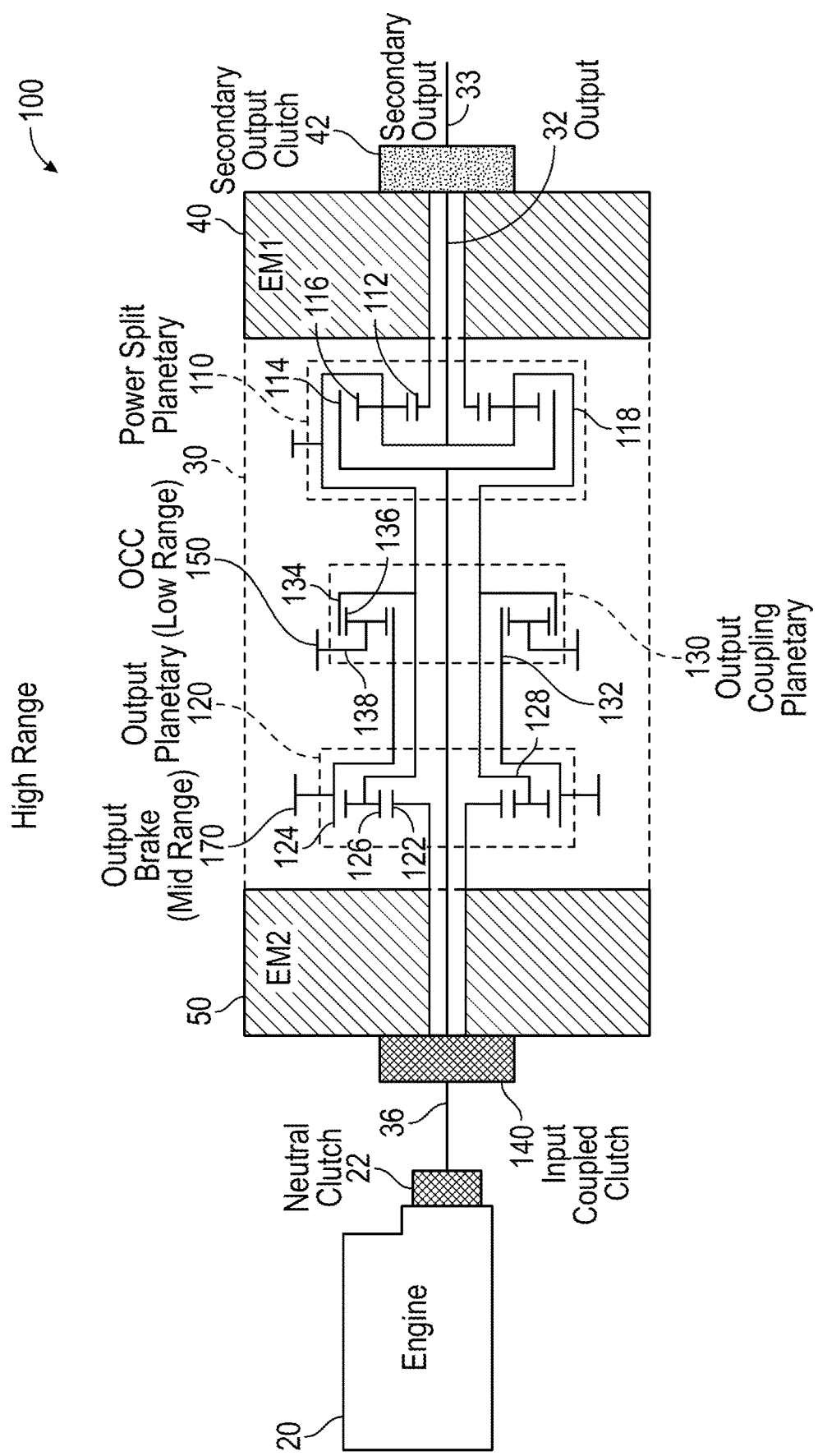
FIG. 8 is a detailed schematic view of the drive train of FIG. 1 configured in a high range mode of operation.

As shown in FIG. 8, the transmission 30 is selectively reconfigured into a high range mode of operation such that the transmission 30 allows for a high output speed operation (e.g., in a forward direction of travel, etc.). In one embodiment, the engine 20 provides a rotational mechanical energy input such that the second electromagnetic device 50 generates electrical power while the first electromagnetic device 40 uses the generated electrical power to provide a rotational mechanical energy output. As such, at least one of the engine 20 and the first electromagnetic device 40 provide rotational mechanical energy to drive at least one of tires 62 and tires 72. In an alternative embodiment, the first electromagnetic device 40 operates as a generator and the second electromagnetic device 50 operates as a motor when the transmission 30 is configured in the high range mode.

As shown in FIG. 8 and Table 1, the neutral clutch 22 and the input coupled clutch 140 are engaged when the transmission 30 is configured in the high range mode. As shown in FIG. 8, the engagement of the input coupled clutch 140 with the connecting shaft 36 rotationally couples the engine 20 and the second electromagnetic device 50. By way of example, the engine 20 may provide a rotational mechanical energy input to connecting shaft 36 such that the second electromagnetic device 50 generates electrical energy. In one embodiment, the first electromagnetic device 40 receives the electrical energy generated by the second electromagnetic device 50. The first electromagnetic device 40 operates as a motor, providing a rotational mechanical energy input to the sun gear 112 that drives the plurality of planetary gears 116 and the carrier 118. In another embodiment, the second electromagnetic device 50 receives electrical energy (e.g., from an energy storage device) and provides rotational mechanical energy to the connecting shaft 36 to drive the ring gear 114. In such an embodiment, the neutral clutch 22 may be disengaged (e.g., to permit rotation of the connecting shaft 36 without running the engine 20).

Referring still to FIG. 8, power from the engine 20 and/or the second electromagnetic device 50 is transferred to the ring gear 114 and the plurality of planetary gears 116. The plurality of planetary gears 116 are driven by at least one of the engine 20 (e.g., through the ring gear 114, etc.), the first electromagnetic device 40 (e.g., through the sun gear 112, etc.), the second electromagnetic device 50 (e.g., through the ring gear 114, etc.). The carrier 118 rotates, which drives the output shaft 32 such that the rotational mechanical energy provided by the engine 20 and the first electromagnetic device 40 drives a vehicle at a high range speed.

Figure 9:
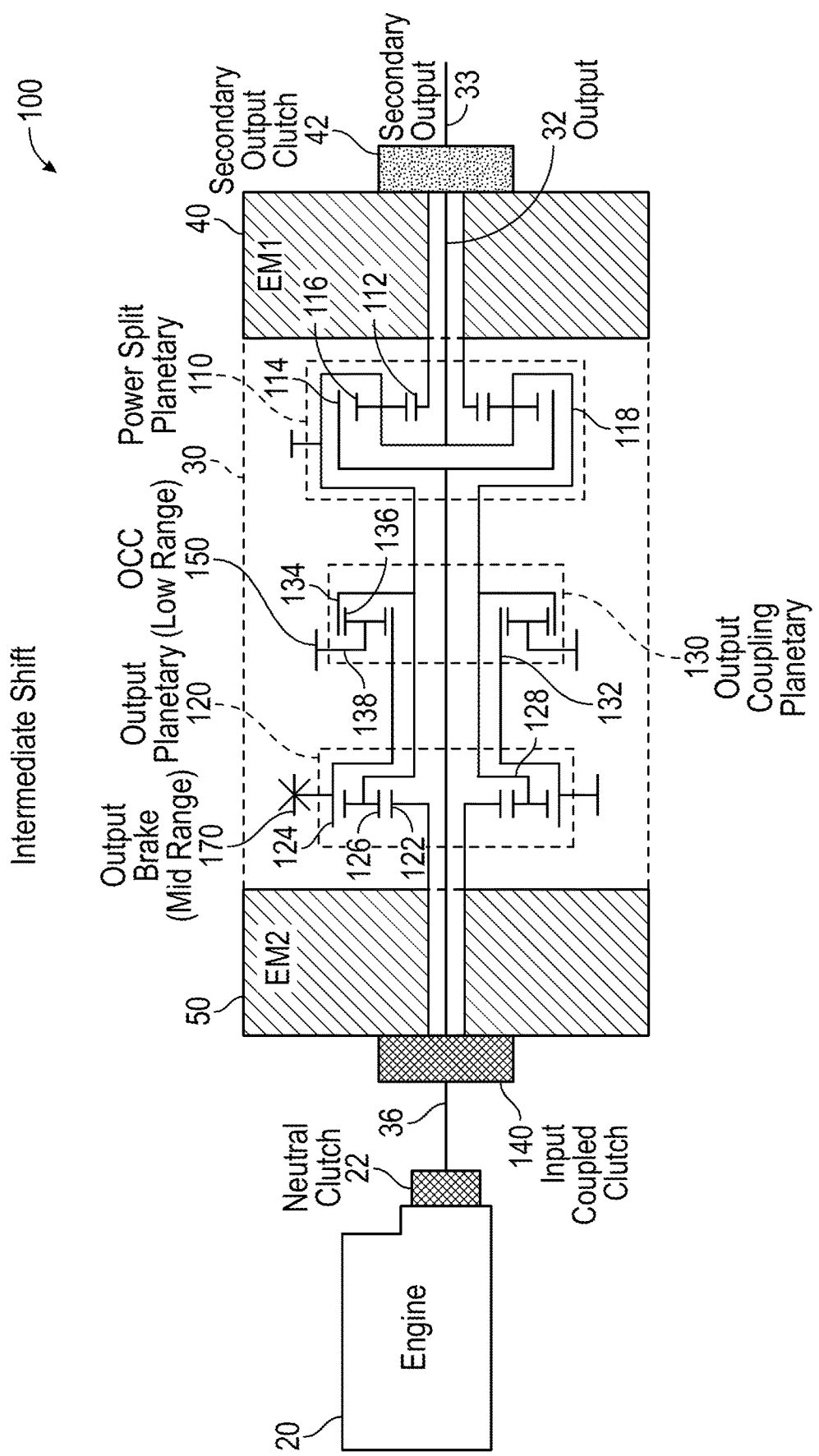
FIG. 9 is a detailed schematic view of the drive train of FIG. 1 configured in an intermediate shift mode of operation.

As shown in FIG. 9, the transmission 30 is selectively reconfigured into an intermediate shift mode of operation that facilitates transitioning the transmission 30 (i.e., shifting, changing modes, etc.) between the mid range mode of operation and the high range mode of operation. According to the embodiment shown in FIG. 9, the neutral clutch 22, the input coupled clutch 140, and the output brake 170 are engaged when the transmission 30 is selectively reconfigured into the intermediate shift mode of operation. According to an exemplary embodiment, the intermediate shift mode provides a smooth and robust shifting strategy that functions reliably even in a wide variety of operating conditions, when using various types of oil for the components of the transmission 30, and when experiencing valve nonlinearities that may be present in one or more valves of the transmission 30. The intermediate shift mode may provide a zero inertia shift through and across two or more overlapping ranges (e.g., the mid range and the high range, etc.). According to the exemplary embodiment shown in FIGS. 7-9, the intermediate shift mode eliminates the need to simultaneously disengage the output brake 170 and engage the input coupled clutch 140 to shift from the mid range mode to the high range mode, or vice versa. The intermediate shift mode reduces jerking sensations associated with simultaneously disengaging the output brake 170 and engaging the input coupled clutch 140 to shift from mid range to high range, providing a smoother ride.

During operation, the intermediate shift mode may be used to shift from mid range mode to high range mode or from high range mode to mid range mode. In one embodiment, when shifting between the mid range mode and the high range mode, both the input coupled clutch 140 and the output brake 170 are engaged for a period of time prior to disengaging the input coupled clutch 140 or the output brake 170. The transmission 30 may be selectively reconfigured into the intermediate shift mode in response to one or more inputs reaching a predetermined threshold condition, the inputs including a rotational speed of the second electromagnetic device 50 and a rotational speed of connecting shaft 36 and/or the engine 20. One or more sensors may be positioned to monitor the rotational speed of at least one of the engine 20, the connecting shaft 36, a portion of the second electromagnetic device 50, or still another component. A controller (e.g., the controller 210, etc.) may reconfigure the transmission 30 into the intermediate shift mode in response to sensing signals provided by the one or more sensors.

Figure 10:
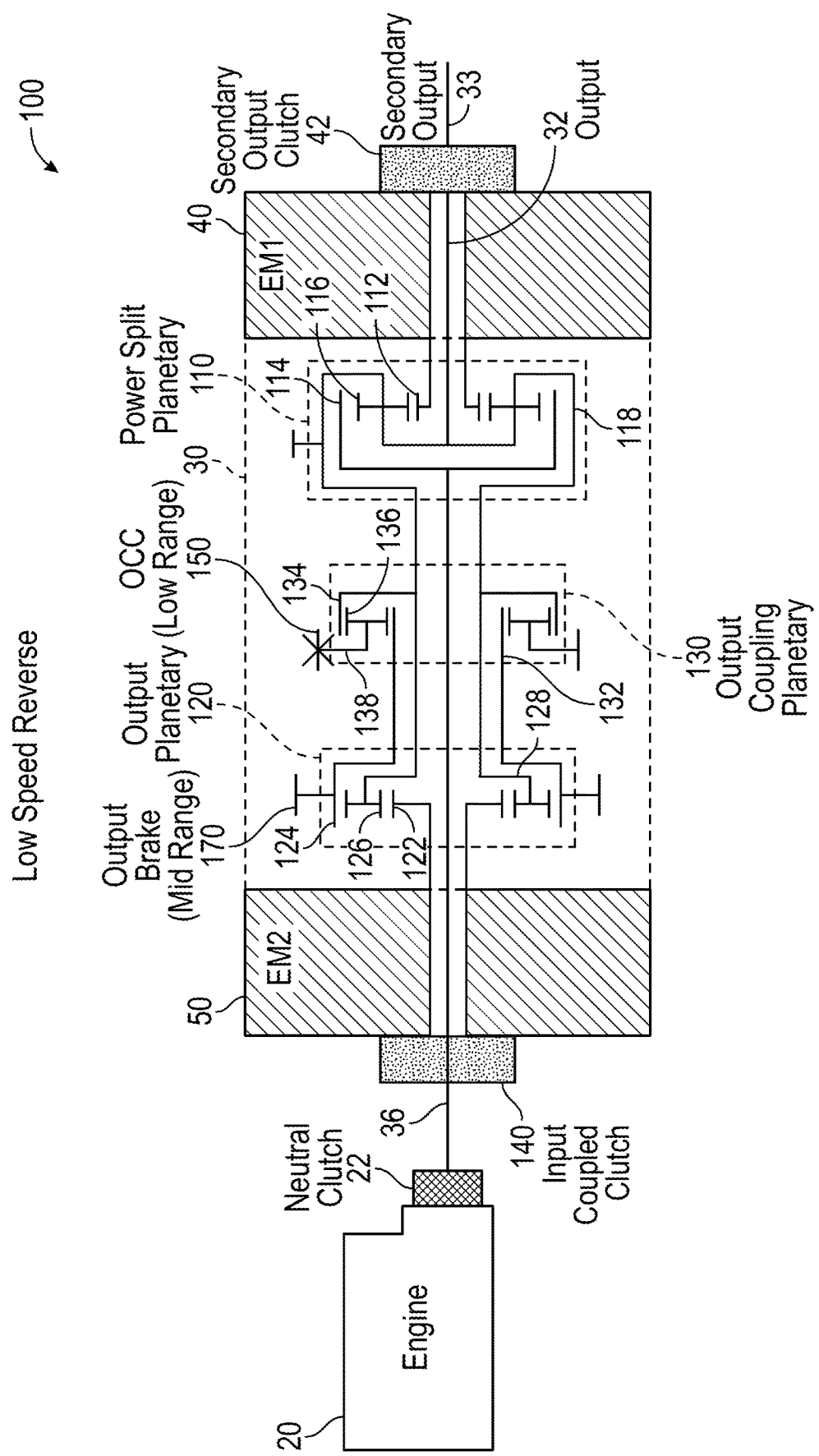
FIG. 10 is a detailed schematic view of the drive train of FIG. 1 configured in a low speed reverse mode of operation.

As shown in FIG. 10, the transmission 30 is selectively reconfigured into a low speed reverse mode of operation. In one embodiment, the engine 20 provides a rotational mechanical energy input to the transmission 30 such that the first electromagnetic device 40 generates electrical power and the second electromagnetic device 50 uses the generated electrical power to provide a rotational mechanical energy input to the transmission 30. As such, at least one of the engine 20 and the second electromagnetic device 50 provide rotational mechanical energy to drive at least one of tires 62 and tires 72 in a reverse direction (e.g., backwards, etc.). In an alternative embodiment, the first electromagnetic device 40 operates as a motor and the second electromagnetic device 50 operates as a generator when the transmission 30 is configured in the low range reverse mode.

As shown in FIG. 10 and Table 1, the neutral clutch 22 and the output coupled clutch 150 are engaged when the transmission 30 is configured in the low speed reverse mode. As shown in FIG. 10, the low speed reverse mode is substantially similar to the low range mode of FIG. 6 in that the output coupled clutch 150 fixes the carrier 138 such that the output coupling planetary 130 couples the ring gear 124 to the carrier 118 and the output shaft 32. In the low speed reverse mode, the second electromagnetic device 50 may provide a rotational mechanical energy input to the transmission 30 in an opposite direction as compared to the low range mode of FIG. 6.

Figure 11:
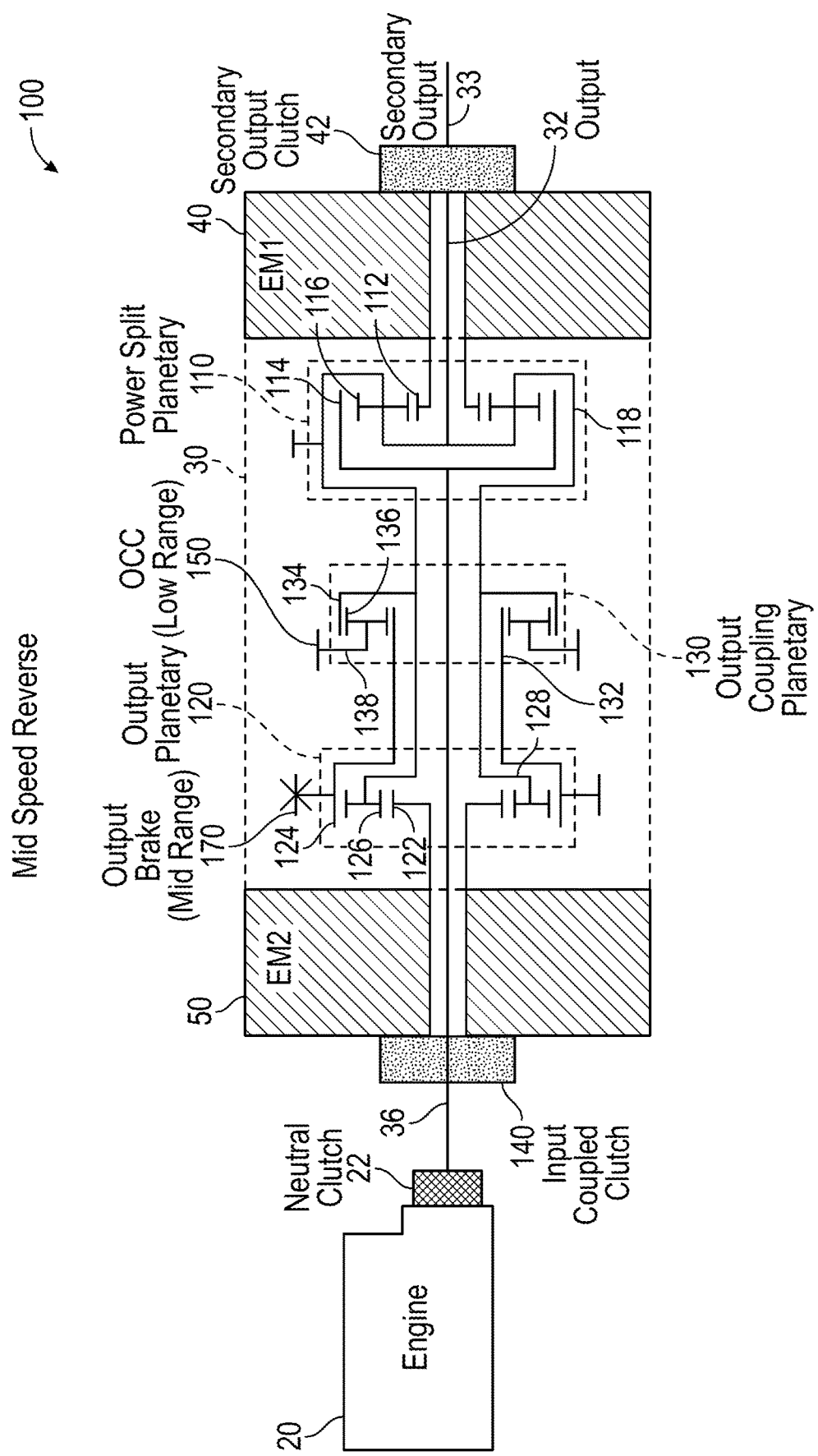
FIG. 11 is a detailed schematic view of the drive train of FIG. 1 configured in a mid speed reverse mode of operation.

As shown in FIG. 11, the transmission 30 is selectively reconfigured into a mid speed reverse mode of operation such that the transmission 30 allows for a mid reverse output speed operation. In one embodiment, the engine 20 provides a rotational mechanical energy input such that the first electromagnetic device 40 generates electrical power, and the second electromagnetic device 50 uses the generated electrical power to provide a rotational mechanical energy input to the transmission 30. As such, at least one of the engine 20 and the second electromagnetic device 50 provides a rotational mechanical energy input to drive at least one of tires 62 and tires 72 in a reverse direction (e.g., backwards). In an alternative embodiment, the second electromagnetic device 50 operates as a generator and the first electromagnetic device 40 operates as a motor when the transmission 30 is configured in the mid speed reverse mode. In still another alternative embodiment, both the first electromagnetic device 40 and the second electromagnetic device 50 operate as a generator in the mid speed reverse mode.

As shown in FIG. 11 and Table 1, the neutral clutch 22 and the output brake 170 are engaged when the transmission 30 is configured in the mid speed reverse mode. As shown in FIG. 11, the output brake 170 inhibits the rotation of (e.g., rotationally fixes) the ring gear 124 and the sun gear 132. According to the exemplary embodiment shown in FIG. 11, an energy flow path for the mid speed reverse mode includes: the engine 20 providing a rotational mechanical energy input to connecting shaft 36 that is conveyed to the ring gear 114; and the ring gear 114 driving the plurality of planetary gears 116 to rotate about central axes thereof, as well as about the sun gear 112 such that both the carrier 118 and the sun gear 112 rotate.

Referring still to FIG. 11, the rotation of the carrier 118 drives the carrier 128, which rotates the plurality of planetary gears 126 about central axes thereof, as well as about the sun gear 122. With the ring gear 124 fixed by the output brake 170, the second electromagnetic device 50 may operate as a motor. In one embodiment, the second electromagnetic device 50 receives electrical energy generated by the first electromagnetic device 40. Accordingly, the first electromagnetic device 40 operates as a generator, removing a rotational mechanical energy from the sun gear 112. The second electromagnetic device 50 receives electrical energy from the first electromagnetic device 40, applying a rotational mechanical torque to the sun gear 122. The sun gear 122 conveys the rotational mechanical torque to the plurality of planetary gears 126 such that each further rotates about the sun gear 122 (e.g., at an increased rotational speed, etc.). The rotation of the plurality of planetary gears 126 (e.g., effected by the sun gear 122, etc.) drives the carrier 128 and thereby the carrier 118. The carrier 118 drives the output shaft 32 at a mid reverse output speed and may thereby drive a vehicle at a mid reverse output speed.

Figure 12:
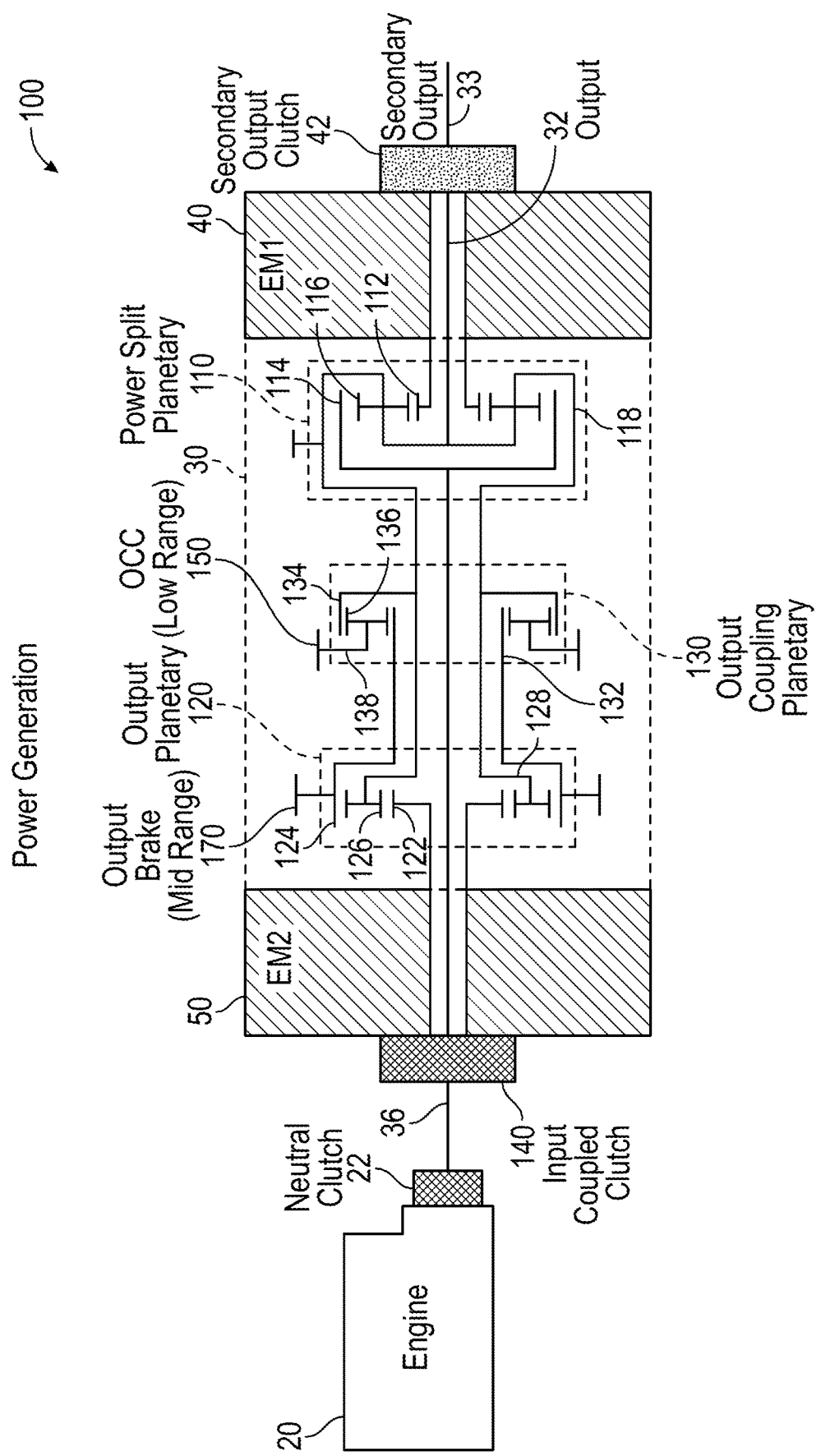
FIG. 12 is a detailed schematic view of the drive train of FIG. 1 configured in a power generation mode of operation.

As shown in FIG. 12, the transmission 30 is selectively reconfigured into a power generation mode such that rotation of connecting shaft 36 rotates the first electromagnetic device 40 and the second electromagnetic device 50 to generate electrical power. In one embodiment, the electrical power is stored for future use. In another embodiment, the electrical power is used to power internal devices (e.g., the control system 200, components of the vehicle 10, etc.) and/or external devices. As shown in FIG. 12 and Table 1, the neutral clutch 22 and the input coupled clutch 140 are engaged when the transmission 30 is configured in the power generation mode.

According to an exemplary embodiment, the engine 20 provides a rotational mechanical energy input to connecting shaft 36, which drives both the first electromagnetic device 40 and the second electromagnetic device 50. As shown in FIG. 12, the second electromagnetic device 50 is rotationally coupled to the engine 20 by the engagement of the input coupled clutch 140 with connecting shaft 36 such that the second electromagnetic device 50 generates electrical power. According to the exemplary embodiment shown in FIG. 12, an energy flow path for the power generation mode includes: the connecting shaft 36 provides rotational mechanical energy to the ring gear 114 of the power split planetary 110; the ring gear 114 conveys the rotational mechanical energy from connecting shaft 36 to the plurality of planetary gears 116; the plurality of planetary gears 116 rotate about central axes thereof, thereby transferring rotational mechanical energy to the sun gear 112; the sun gear 112 provides the rotational mechanical energy from the engine 20 to the first electromagnetic device 40 through the shaft of the first electromagnetic device 40 such that the first electromagnetic device 40 generates electrical power. In some embodiments, a brake is applied to the front axle 60 and/or the rear axle 70 to prevent movement of the vehicle 10 in the power generation mode.

According to an alternative embodiment, the engine 20 does not provide a rotational mechanical energy input to drive a vehicle. By way of example, the first electromagnetic device 40, the second electromagnetic device 50, and/or another device may store energy during the above mentioned modes of operation. When sufficient energy is stored (e.g., above a threshold level, etc.), at least one of the first electromagnetic device 40 and the second electromagnetic device 50 may provide a rotational mechanical energy output such that the vehicle is driven without an input from the engine 20 (e.g., an electric mode, etc.).

In some such embodiments, the engine 20 is omitted from the vehicle 10, such that the vehicle 10 is a pure electric vehicle. In such embodiments, the vehicle 10 may be powered by electrical energy. The vehicle 10 may include an energy storage device (e.g., batteries, capacitors, supercapacitors, a fuel cell, etc.) that provides electrical energy to power the first electromagnetic device 40 and/or the second electromagnetic device 50. The energy storage device may be charged by an offboard electrical energy source (e.g., a generator, an electrical grid, etc.) located offboard of the vehicle. Additionally or alternatively, the vehicle 10 may include an onboard device configured to generate electrical energy (e.g., a generator, a solar panel, etc.) to power the first electromagnetic device 40 and/or the second electromagnetic device 50 and to charge the energy storage device.

Figure 13:
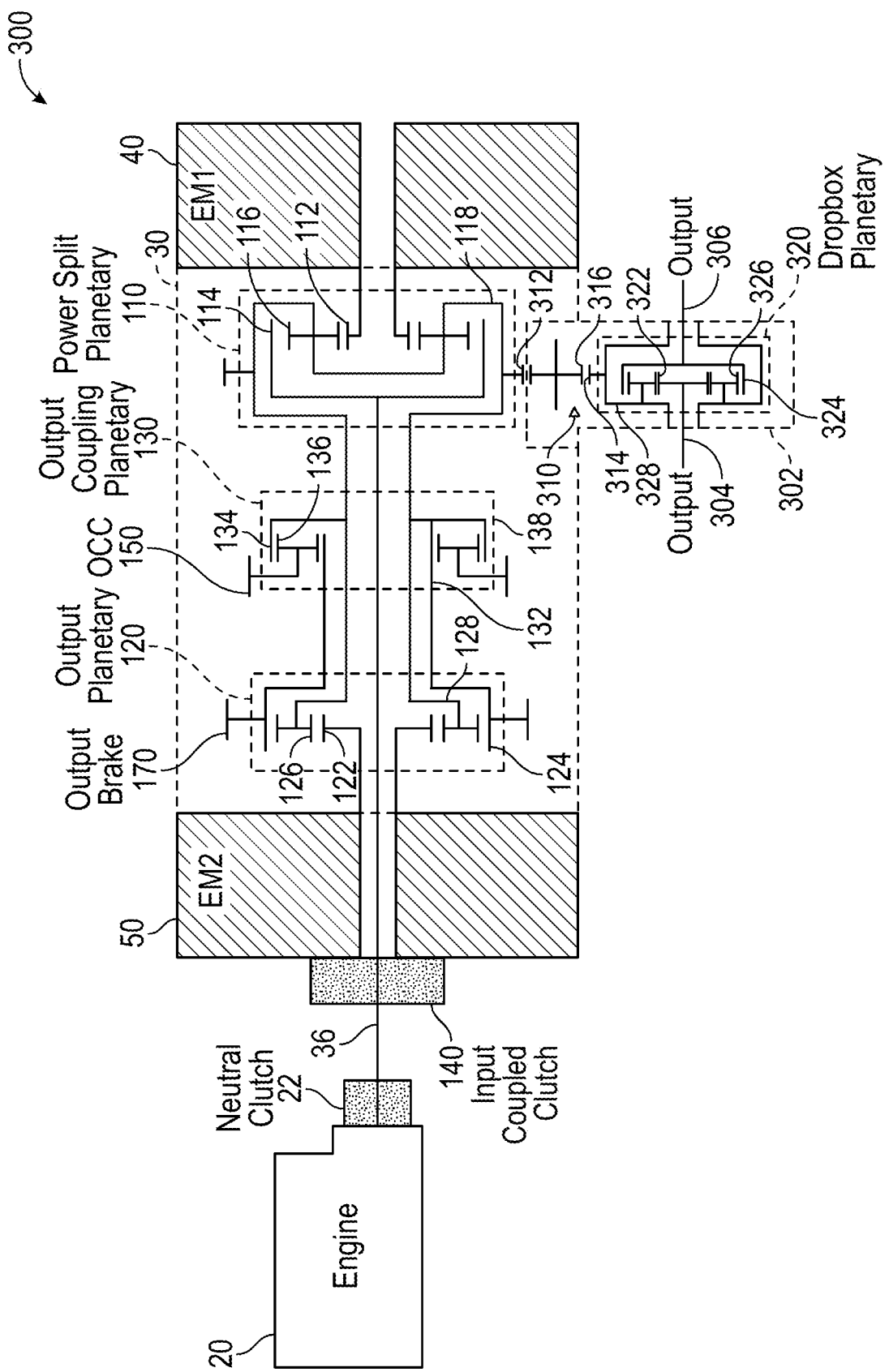
FIG. 13 is a detailed schematic view of a drive train for a vehicle, according to another exemplary embodiment.

Referring to FIG. 13, a drive system 300 for the vehicle 10 is shown as an alternative embodiment of the drive system 100. The drive system 300 may be substantially similar to the drive system 100 except as otherwise specified herein. In the drive system 300, the output shaft 32, the secondary output shaft 33, and the secondary output clutch 42 are omitted, according to an exemplary embodiment. The drive system 300 includes a power transmission device, shown as dropbox 302. The dropbox 302 transfers rotational mechanical energy from the carrier 118 to a pair of output shafts, shown as output shaft 304 and output shaft 306. The connecting shaft 36, the power split planetary 110, the output planetary 120, and the output coupling planetary 130 are aligned along a first central axis. The output shaft 304 and the output shaft 306 are aligned along a second central axis that is offset from the first central axis. This offset arrangement may facilitate certain placements of the engine 20 and the transmission 30 that might otherwise be difficult to accommodate using the in-line arrangement of the drive system 100. In an alternative embodiment, a drive system includes both the output shaft 32 and the dropbox 302.

The output shaft 304 and/or the output shaft 306 may be coupled to at least one of the rear axle driveshaft 76 and the front axle driveshaft 66. By way of example, the output shaft 304 and/or the output shaft 306 may be coupled to a transfer case and/or the rear axle driveshaft 76 where the transmission 30 is installed in place of a traditional, mechanical, straight-thru transmission. By way of another example, the output shaft 304 may be coupled to the front axle driveshaft 66, and the output shaft 306 may be coupled to the rear axle driveshaft 76. In another embodiment, at least one of the outputs is a power take-off output, and the output shaft 304 and/or the output shaft 304 is coupled thereto. A clutch assembly may be engaged and disengaged to selectively couple at least one of the front axle driveshaft 66, a transfer case, and the rear axle driveshaft 76 to the output shaft 304 and/or the output shaft 306 of the transmission 30 (e.g., to facilitate operation of a vehicle in a rear-wheel-drive mode, an all-wheel-drive mode, a four-wheel-drive mode, a front-wheel-drive mode, etc.). Additionally or alternatively, a clutch assembly may be engaged and disengaged to selectively couple a PTO output to the output shaft 304 and/or the output shaft 306 of the transmission 30 (e.g., to facilitate powering another system, such as a pump, a generator, a compressor, etc.).

As shown, the dropbox 302 includes a gear set 310. The gear set 310 includes a first gear, shown as gear 312, directly rotationally coupled to and aligned with the carrier 118 of the power split planetary 110. A second gear of the gear set 310, shown as gear 314, is offset from the gear 312. In some embodiments, the gear 314 is aligned with the output shaft 304 and the output shaft 306. A third gear of the gear set 310, shown as gear 316, is in meshing engagement with the gear 312 and the gear 314. The gear 316 acts as an idler, offsetting the gear 312 a greater distance from the gear 314 and reversing the direction of rotation of the gear 314 relative to the gear 312. In other embodiments, additional idler gears are added in series with the gear set 310 to vary the distance between the gear 312 and the gear 314 and/or to change the direction of rotation of the gear 314 relative to the gear 312. In yet other embodiments, the gear 316 is omitted, and the gear 312 is in meshing engagement with the gear 314.

As shown in FIG. 13, the dropbox 302 includes a power transmission device or gear set, shown as dropbox planetary 320. In one embodiment, the dropbox planetary 320 is aligned with the output shaft 304 and the output shaft 306. The dropbox planetary 320 may be a planetary gear set that includes a sun gear 322, a ring gear 324, and a plurality of planetary gears 326. The plurality of planetary gears 326 couple the sun gear 322 to the ring gear 324, according to an exemplary embodiment. As shown in FIG. 13, a carrier 328 rotationally supports the plurality of planetary gears 326. In one embodiment, the gear 314 is directly rotationally coupled to the carrier 328 such that the power split planetary 110 is coupled to the dropbox planetary 320 through the gear set 310. In one embodiment, the output shaft 304 is directly rotationally coupled to the sun gear 322, and the output shaft 306 is directly rotationally coupled to the ring gear 324. Accordingly, the dropbox planetary 320 may couple the output shaft 304 and the output shaft 306 to the carrier 118 through the gear set 310.

The dropbox 302 may be used to drive the output shaft 304 and/or the output shaft 306 of the drive system 300 in any situation where the carrier 118 would rotate to drive the output shaft 32 in the drive system 100 (e.g., the low range mode, the high range mode, etc.). According to an exemplary embodiment, an energy flow path through the dropbox 302 includes: the carrier 118 and the gear 312 being driven by at least one of the engine 20, the first electromagnetic device 40, or the second electromagnetic device 50; the gear 312 providing a rotational mechanical energy input to the gear 316; the gear 316 conveying the rotational mechanical energy to the gear 314 and the carrier 328; the carrier 328 driving the plurality of planetary gears 326 to rotate about the sun gear 322 and about central axes thereof such that the sun gear 322 is driven; and the sun gear 322 driving the output shaft 304. According to another exemplary embodiment, an energy flow path through the dropbox 302 includes: the carrier 118 and the gear 312 being driven by at least one of the engine 20, the first electromagnetic device 40, or the second electromagnetic device 50; the gear 312 providing a rotational mechanical energy input to the gear 316; the gear 316 conveying the rotational mechanical energy to the gear 314 and the carrier 328; the carrier 328 driving the plurality of planetary gears 326 to rotate about the sun gear 322 and about central axes thereof such that the ring gear 324 is driven; and the ring gear 324 driving the output shaft 306. In another embodiment of a drive system that includes both the dropbox 302 and the output shaft 32, the output shaft 32 may be driven simultaneously with the output shaft 304 and/or the output shaft 306.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle as shown in the various exemplary embodiments is illustrative only. Additionally, any element disclosed in one embodiment may be incorporated or utilized with any other embodiment disclosed herein. For example, the dropbox 302 of the exemplary embodiment described in at least FIG. 13 may be incorporated in the drive system 100 of the exemplary embodiment described in at least FIG. 2. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A drive system for a vehicle, comprising:
a first planetary gear set;
a second planetary gear set;
a third planetary gear set including a sun gear, a ring gear, a plurality of planetary gears coupling the sun gear to the ring gear, and a carrier rotationally supporting the plurality of planetary gears, wherein the ring gear is directly coupled to the first planetary gear set and directly coupled to a carrier of the second planetary gear set, and wherein the sun gear is directly coupled to a ring gear of the second planetary gear set;
a first electromagnetic device coupled to the first planetary gear set;
a second electromagnetic device coupled to the second planetary gear set; and
an output shaft coupled to the first planetary gear set.

2. The drive system of claim 1, further comprising a brake positioned to limit rotation of the third planetary gear set when engaged.

3. The drive system of claim 2, wherein the brake is positioned to prevent rotation of the carrier of the third planetary gear set when engaged.

4. The drive system of claim 3, wherein the third planetary gear set is configured to limit rotation of a ring gear of the second planetary gear set relative to at least one of (a) a carrier of the first planetary gear set or (b) the carrier of the second planetary gear set when the brake is engaged.

5. The drive system of claim 1, wherein the ring gear of third planetary gear set is directly coupled to a carrier of the first planetary gear set.

6. A drive system for a vehicle, comprising:
a first planetary gear set;
a second planetary gear set;
a third planetary gear set directly coupled to the first planetary gear set and the second planetary gear set;
a first electromagnetic device coupled to the first planetary gear set;
a second electromagnetic device coupled to the second planetary gear set; and
an output shaft coupled to the first planetary gear set; and
a connecting shaft directly coupled to the first planetary gear set and extending through the third planetary gear set,
wherein the third planetary gear set is aligned with the first planetary gear set and the second planetary gear set.

7. The drive system of claim 6, wherein the output shaft is a first output shaft, further comprising a dropbox planetary comprising:
a carrier coupled to a carrier of the first planetary gear set;
a ring gear coupled to the first output shaft; and
a sun gear coupled to a second output shaft.

8. The drive system of claim 7, wherein the first output shaft, the second output shaft, and the dropbox planetary are radially offset from the third planetary gear set.

9. The drive system of claim 6, further comprising a brake configured to limit movement of a carrier of the third planetary gear set when engaged.

10. The drive system of claim 6, wherein the connecting shaft extends through the third planetary gear set, the second planetary gear set, and the second electromagnetic device.

11. The drive system of claim 6, further comprising a clutch configured to selectively limit rotation of the connecting shaft relative to the second planetary gear set.

12. The drive system of claim 6, further comprising a clutch configured to selectively limit rotation of the first planetary gear set relative to the second planetary gear set.

13. The drive system of claim 6, further comprising a clutch configured to selectively limit rotation of the connecting shaft relative to the second electromagnetic device.

14. The drive system of claim 6, wherein the connecting shaft extends through the second electromagnetic device.

15. The drive system of claim 6, wherein the connecting shaft is aligned with the third planetary gear set.

16. A drive system for a vehicle, comprising:
a first planetary gear set;
a second planetary gear set;
a third planetary gear set including a sun gear, a ring gear, a plurality of planetary gears coupling the sun gear to the ring gear, and a carrier rotationally supporting the plurality of planetary gears, wherein the ring gear is directly coupled to a carrier of the first planetary gear set and a carrier of the second planetary gear set, and wherein the sun gear is directly coupled to the second planetary gear set;
a first electromagnetic device coupled to the first planetary gear set;
a second electromagnetic device coupled to the second planetary gear set; and
an output shaft coupled to the first planetary gear set.

17. The drive system of claim 16, further comprising a brake positioned to limit rotation of the third planetary gear set when engaged.

18. The drive system of claim 17, wherein the brake is positioned to prevent rotation of the carrier of the third planetary gear set when engaged.

19. The drive system of claim 18, wherein the third planetary gear set is configured to limit rotation of a ring gear of the second planetary gear set relative to at least one of (a) the carrier of the first planetary gear set or (b) the carrier of the second planetary gear set when the brake is engaged.

20. The drive system of claim 16, wherein the sun gear of third planetary gear set is directly coupled to a ring gear of the second planetary gear set.

* * * * *